United States Patent
Le et al.

(10) Patent No.: US 10,946,310 B2
(45) Date of Patent: Mar. 16, 2021

(54) ALTERNATING FLOW COLUMN CHROMATOGRAPHY APPARATUS AND METHOD OF USE

(71) Applicants: Van So Le, Wolli Creek (AU); Minh Khoi Le, Wolli Creek (AU)

(72) Inventors: Van So Le, Wolli Creek (AU); Minh Khoi Le, Wolli Creek (AU)

(*) Notice: Subject to any disclaimer, the term of this patent is extended or adjusted under 35 U.S.C. 154(b) by 0 days.

(21) Appl. No.: 16/304,642

(22) PCT Filed: Jan. 11, 2018

(86) PCT No.: PCT/AU2018/050013
§ 371 (c)(1),
(2) Date: Nov. 26, 2018

(87) PCT Pub. No.: WO2018/129587
PCT Pub. Date: Jul. 19, 2018

(65) Prior Publication Data
US 2020/0054965 A1    Feb. 20, 2020

(30) Foreign Application Priority Data

Jan. 13, 2017  (AU) .............................. 2017900091

(51) Int. Cl.
*B01D 15/22*  (2006.01)
*B01D 15/18*  (2006.01)
(Continued)

(52) U.S. Cl.
CPC ......... *B01D 15/22* (2013.01); *B01D 15/1864* (2013.01); *G01N 30/46* (2013.01);
(Continued)

(58) Field of Classification Search
CPC .................................................. B01D 15/22
(Continued)

(56) References Cited

U.S. PATENT DOCUMENTS 5,958,227 A    9/1999  Uematsu
6,908,557 B2   6/2005  Chordia et al.
(Continued)

FOREIGN PATENT DOCUMENTS

WO        03/00376 A1    1/2003
WO        2015/133972    9/2015

OTHER PUBLICATIONS

International Search Report for PCT/AU2018/050013.
Supplementary European search report dated Sep 28, 2020 for EP Application No. 18738495.

*Primary Examiner* — Walter L Lindsay, Jr.
*Assistant Examiner* — Philipmarcus T Fadul
(74) *Attorney, Agent, or Firm* — Workman Nydegger

(57) ABSTRACT

An alternating flow column chromatography apparatus comprising a 'U' shaped or T shaped separation column including at least one loading port for loading of components for separation, a first purification column in fluid communication with one end of the separation column and a second purification column in fluid communication with another end of the separation column, at least one eluent input port, an eluate output port and an alternating flow valve in fluid communication with the primary eluent input port, the eluate output port, the first purification column and the second purification column wherein, when operated, the alternating flow valve reverses the flow of eluent through the purification columns and the separation column. Also a method of using the apparatus. A benefit of the apparatus and method is more efficient operation compared to existing direct flow column chromatography apparatuses.

22 Claims, 8 Drawing Sheets

(51) Int. Cl.
    *G01N 30/46*     (2006.01)
    *G01N 30/60*     (2006.01)
    *G21G 1/00*     (2006.01)
    *G01N 30/38*     (2006.01)
    *G01N 30/88*     (2006.01)

(52) U.S. Cl.
    CPC ....... *G01N 30/6052* (2013.01); *G21G 1/0005* (2013.01); *G01N 2030/385* (2013.01); *G01N 2030/8809* (2013.01)

(58) Field of Classification Search
    USPC ........................................................ 73/61.53
    See application file for complete search history.

(56) References Cited

U.S. PATENT DOCUMENTS

| | | |
|---|---|---|
| 7,383,718 B2 | 6/2008 | McCurry et al. |
| 8,767,905 B2 | 7/2014 | Neeley et al. |
| 2009/0225923 A1 | 9/2009 | Neeley et al. |
| 2012/0325052 A1 | 12/2012 | Rösch et al. |
| 2017/0173537 A1* | 6/2017 | Gagnon ................. C07K 1/34 |

* cited by examiner

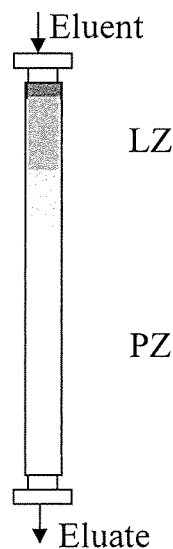
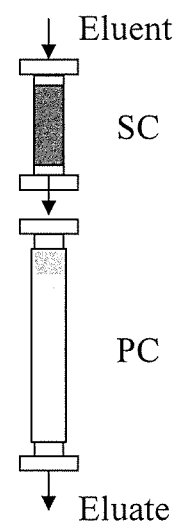
FIG 1
(Prior Art)
FIG 2
(Prior Art)
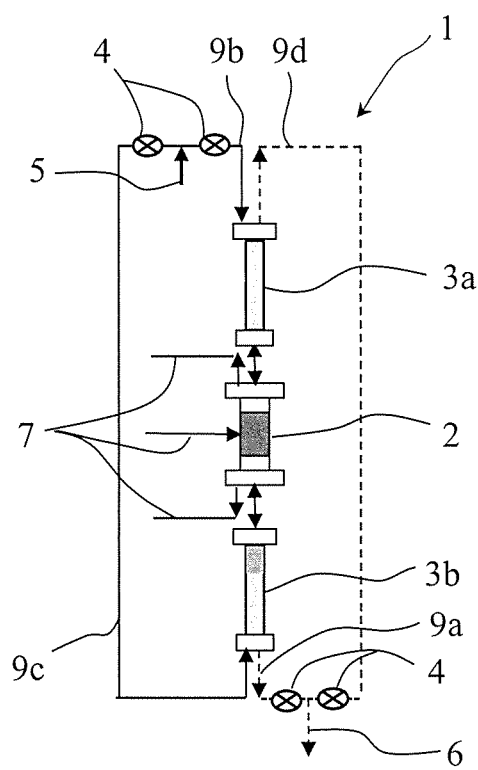
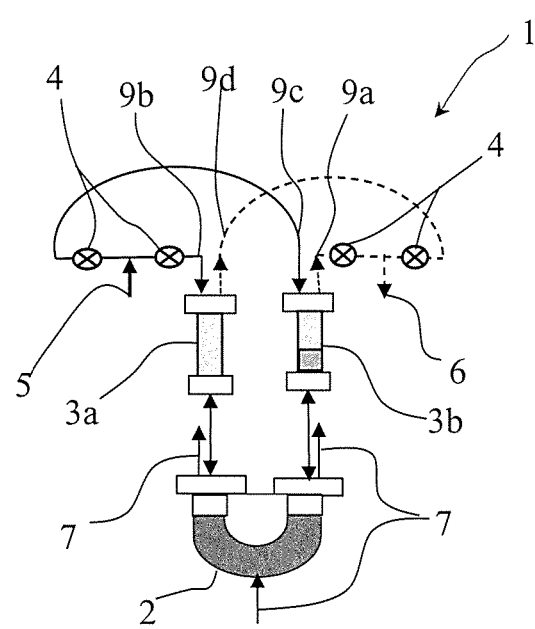
FIG 3
FIG 4

ALTERNATING FLOW COLUMN CHROMATOGRAPHY APPARATUS AND METHOD OF USE

CROSS-REFERENCE TO RELATED APPLICATIONS

The present application is a 35 U.S.C. § 371 U.S. National Stage of International Application No. PCT/AU2018/050013, filed on Jan. 11, 2018, which claims priority to Australian Patent Application No. 2017900091, filed Jan. 13, 2017, the entire content of which is incorporated herein by reference.

TECHNICAL FIELD

This invention relates to radionuclide generators and methods for the manufacture of radionuclides. In particular, the invention relates to a chromatography column that is useful in a radionuclide generator and other applications.

BACKGROUND OF THE INVENTION

Radionuclide Generators

Medical diagnostic and therapeutic applications of radioisotopes have long been recognised by the medical community and are being used to help millions of patients throughout the world. Today the diagnostic imaging and therapeutic application in advanced nuclear medicine using different kinds of radiopharmaceuticals and radioisotopes, such as $^{99m}Tc$, $^{81m}Kr$, $^{68}Ga$, $^{44}Sc$, $^{82}Rb$, $^{188}Re$, $^{213}Bi$, $^{90}Y$, $^{18}F$, $^{131}I$, $^{123}I$, $^{124}I$, $^{11}C$, $^{15}O$, $^{64}Cu$, $^{89}Zr$, $^{51}Cr$, ... is most widely known. Among these $^{99m}Tc$, $^{81m}Kr$, $^{68}Ga$, $^{44}Sc$, $^{82}Rb$, $^{188}Re$, $^{213}Bi$ and $^{90}Y$ (called daughter nuclide) are produced from the radionuclide generators loaded with their parent radionuclide $^{99}Mo$, $^{81}Rb$, $^{68}Ge$, $^{44}Ti$, $^{82}Sr$, $^{188}W$, $^{225}Ac$ and $^{90}Sr$, respectively. The reasonably long half-life of parent radionuclide allows for transport to radiopharmacies over long distances without too much loss from nuclear decay. At the point and time of use, daughter (target) radionuclide is separated (eluted) from the radionuclide generator with a solvent, regularly with normal saline or dilute acidic solution through a process called elution.

The short-lived radioactive isotopes produced from radionuclide generators are used for imaging diagnosis in nuclear medicine and in biomedical research, while the longer-lived radionuclides are used for therapeutic purposes. The cost-effective utilisation of a radionuclide generator and the quality of imaging diagnoses or therapeutic treatment procedures are being controlled by the generator operation/elution management. Generally, a daughter (target) radionuclide eluate solution is produced from the radionuclide generator in fixed volume and the concentration (expressed as activity per mL) of the daughter nuclide in the eluate decreases with the lifetime of the generator due to the radioactive decay of the parent nuclide in use. The quality of generator eluate (daughter nuclide concentration and purity) is influenced by several factors such as the method of generator production including generator design and daughter nuclide elution technique, generator column packing material (sorbent and/or solid substrate containing parent nuclide) and generator elution time schedule. Effective utilisation of the radionuclide generator therefore, depends not only on the available daughter nuclide activity in the generator, but also on the concentration and purity of the daughter radionuclide recovered in the eluate solution separated (eluted) from the generator, which are the primary factors pertaining to the Nuclear Medicine Procedures' quality.

Radionuclide Generators Used in Single Photon Emission Computed Tomography (SPECT) for Diagnostic Imaging.

As an example, among the generators ($^{99m}Tc$- and $^{81m}Kr$- generator) used for production of single photon emitting radionuclides used in SPECT procedures the $^{99m}Tc$ generator is a well-known example and most widely used in SPECT diagnostic imaging. $^{99m}Tc$ is being used in approximately 85% of diagnostic imaging procedures in nuclear medicine worldwide. $^{99m}Tc$ is a metastable isotope of technetium. This means it has at least two modes of decay with two different half-lives. The decay mode with the shorter half-life of approximately 6 hours decays via gamma-ray emission (with an energy of 140 keV) to its ground state ($^{99}Tc$) which in turn decays via pure beta emission with a half-life of $2.13 \times 10^5$ years to stable $^{99}Ru$. The medically useful $^{99m}Tc$ is produced from the radioactive decay of its parent radionuclide $^{99}Mo$ which has a half-life of approximately 66 hours. $^{99}Mo$ can be produced by neutron-induced fission of $^{235}U$ which gives high specific activity of $^{99}Mo$. Alternatively the supply of $^{99}Mo$ is based on research reactor produced $^{99}Mo$ sources by using the (n,γ) neutron capture nuclear reaction with natural Mo, resulting in inexpensive but low specific activity $^{99}Mo$. However, the $^{99}Mo$ produced using (n,γ) nuclear reaction generally has a specific activity 10,000 times lower than that of fission-produced $^{99}Mo$.

As per the separation techniques applied in the radionuclide generator for separation of SPECT radionuclide from its parent nuclide, among the separation techniques developed so far, the conventional column chromatographic method with direct flow elution technique or shortly the "direct flow column chromatographic" method (DFCC method) is currently used in all types of radionuclide generators. The generator column packing materials are the inorganic sorbent materials or the solid substrates containing parent nuclides. The solution (eluent) used for column elution of the target radionuclides are usually saline or pure water.

The column packing materials used in DFCC method-based $^{99m}Tc$ generator for immobilizing parent nuclide $^{99}Mo$ can be classified into two following groups:

Sorbent materials, which will be post-loaded with $^{99}Mo$ nuclide after the column packing process has been completed. In the DFCC method-based $^{99m}Tc$ generator the typical load of Mo element in the generator column is usually less than 10% of the maximal Mo-loading capacity of the sorbent applied. This sorbent material group includes different forms of alumina, zircona, and titania; mixed oxides of tetravalent metals Zr, Ti, and Sn; inorganic polymer sorbents PTC (polymeric titanium compound) and PZC (polymeric zirconium compound) in the column preloading technology; functionalized silica and alumina; TiOH or ZrOH imbedded organic polymer and chitosan. The low $^{99}Mo$ adsorption capacity and/or poor adsorption-desorption kinetics of available generator-column packing materials are challenging the use of low specific activity $^{99}Mo$, specifically because a large column is required to produce a generator of acceptable activity. So large eluent volumes required to elute $^{99m}Tc$-nuclide from the generator then cause the radioactive concentration of the $^{99m}Tc$-eluate solution to become unacceptably low for use in most radiopharmaceutical diagnostic procedures. This challenging issue arises for the manufacturing technology of different radionuclide generators as well. Hence, not only the generator column packing material but also the radionuclide generator production technology needs further development to overcome or ameliorate the above outlined disadvantages of existing DFCC method-based radionuclide generators. Mo-substrates, which are the solid materials composed of $^{99}$Mo as a component in its matrix in the form of solid gel or inorganic polymers formed by chemical reaction of a polymeric solid reagent with ($^{99}$Mo)-molybdate ions. These solid materials are ready for packing the generator columns and no more $^{99}$Mo-loading after the completion of the column packing process. This group includes the Zirconium- or Titanium-($^{99}$Mo)Molybdate gels (so called "gel technology") and the inorganic polymer sorbents PTC and PZC in the column post-loading technology. This technique requires a safeguard (purification) column connected with the generator column at its outlet end to retain the parent nuclide breakthrough during the operation of the target (daughter) nuclide separation elution. To make sure that multiple separation elutions of target nuclide are performed without the parent nuclide breakthrough in the final product eluate, the safeguard column should be large enough in size. This situation is the cause of unwanted large volume and dilute concentration of the target nuclide eluate produced from the DFCC method-based $^{99m}$Tc generators. This unfavourable issue arises for the manufacturing technology of different radionuclide generators as well. Hence, the radionuclide generator production technology needs further development to overcome or ameliorate the above outlined disadvantages of existing DFCC method-based radionuclide generators for improvement of generator performance.

The Radionuclide Generators for Diagnostic Imaging Using Positron-Emission Tomography (PET).

Today, with the fast expansion of advanced superior techniques for tomographic reconstruction in positron emission tomography imaging, the supply of positron-emitting radionuclides becomes crucial. The use of short-lived radioisotopes $^{18}$F, $^{11}$C and $^{15}$O in PET imaging is well established. Unfortunately, all of these short-lived (half-life less than 2 hours) positron-emitting radionuclides are only available from onsite, expensive cyclotrons operating in a handful of major hospitals. The radionuclide generator-based production/supply of short-lived radioisotopes used in PET imaging is a preferable choice using reasonably long-lived parent radionuclide allowing for transport to radiopharmacies over long distances. At the point and time of use, daughter (target) radionuclide is separated (eluted) from the radionuclide generator with a solvent for instant use.

The expansion of the use of positron-emitting radionuclides produced from radionuclide generators is always desirable, subsequently benefiting superiority of the PET-based molecular imaging technique. As an example, among the generators routinely used for production of positron emitting radionuclides used in PET procedures ($^{82}$Rb-, $^{44}$Sc- and $^{68}$Ga-generator) the $^{68}$Ga generator finds significant applications in conventional nuclear medicine practice today. It has been known that, among the possible generator-produced positron-emitting nuclides, the $^{68}$Ga isotope, with its desirable half-life of 68 min and generated from the long-lived parent $^{68}$Ge with 287-day half-life, has the greatest potential for wide and cost-effective application in daily clinical PET practice. The readiness of the $^{68}$Ga radioactive isotope to couple to small bio-molecules of metal-bifunctional chelator-biomolecule-conjugate based targeting radiopharmaceuticals makes it potentially an alternative to $^{18}$F- and $^{11}$C-based PET radiopharmaceuticals for imaging of neuroendocrine tumors.

As per the separation techniques applied in the radionuclide generator for separation of PET radionuclide from its parent nuclide, the conventional column chromatographic method with direct flow elution technique or shortly the "direct flow column chromatographic" method (DFCC method) is currently used in all types of PET-radionuclide generators.

DFCC method-based $^{68}$Ga generators were developed using different sorbents as generator column packing materials and either alkaline or acidic solutions or aqueous solutions containing complexing agents as eluents to separate $^{68}$Ga by elution from its parent nuclide $^{68}$Ge, which was immobilized on the column. Among the column techniques applied, the following are worth mentioning: the organic ion exchanger and solid-phase extraction resins, alumina, silica gel, functionalized silica, tin dioxide, titanium dioxide, glass microsphere sorbent, cerium dioxide, hydrous zirconium oxide, lanthanide oxide, polyantimonic acid, nanozirconia sorbent, nanocrystalline mixed oxides of tetravalent metals Zr, Ti, Sn and Ge. Presently, commercial $^{68}$Ga generators using tin dioxide, titanium oxide, or functionalized silica gel sorbent for $^{68}$Ge immobilizing are available. However, the 5 mL dilute HCl solution required for $^{68}$Ga elution and the unavoidably high metallic ion contamination makes these generators' utilization for labelling radiopharmaceuticals impossible. Moreover, the critical level of $^{68}$Ge breakthrough and acidity of the $^{68}$Ga eluate produced from the above-mentioned generator systems also present a disadvantage. To be used in biomedical applications, especially for labelling of targeting radiopharmaceuticals useful in PET imaging as mentioned above, the volume of $^{68}$Ga eluate from the generator column should be minimized and purified to remove the trace amount of $^{68}$Ge breakthrough and metallic ion impurities. Hence, the radionuclide generator production technology needs further development to overcome or ameliorate the above outlined disadvantages of existing DFCC method-based radionuclide generators for improvement of generator performance.

The Radionuclide Generators for Radiopharmaceutical Based Radiation Therapy (RPRT) Application.

In recent years the medical community has seen a new stage of therapeutic radiation application by using a new generation of therapeutic radioisotopes and therapeutic radiopharmaceuticals. Today different radionuclides, such as $^{188}$Re produced from $^{188}$Re-generator, $^{90}$Y produced from $^{90}$Y-generator, $^{177}$Lu, $^{67}$Cu, $^{153}$Sm, $^{166}$Ho, $^{186}$Re, $^{211}$At, $^{131}$I . . . , are successfully used for cancer treatment and other therapeutic procedures. Several chelate compounds developed for radiolabeling of peptides and/or protein entities with metallic radionuclides are well developed. At present there is a fast development of targeting radiopharmaceuticals based on metal-bifunctional chelator-biomolecule-conjugates used for treatment of neuroendocrine tumors. Over the past few years several types of therapeutic targeting radiopharmaceuticals with special properties produced by labelling with generator-radionuclide, including compounds for labelling monoclonal antibodies were designed to be developed. As an example, among the generators used for production of therapeutic radionuclides $^{188}$Re-$^{213}$Bi- and $^{90}$Y-generator) the $^{188}$Re generator finds significant applications in conventional nuclear medicine practice today. Carrier-free $^{188}$Re is produced from a generator system containing $^{188}$W mother nuclides. $^{188}$W nuclide is produced by reactor neutron activation of a target containing $^{186}$W via $^{186}$W (n n,γ) $^{188}$W nuclear reaction.

As per separation techniques applied in the radionuclide generator for separation of therapeutic radionuclide from its parent nuclide, among the separation techniques developed up to today, the conventional column chromatographic method with direct flow elution technique or shortly the "direct flow column chromatographic" method (DFCC method) is currently used in all types of the radionuclide generators. The generator column packing materials are the inorganic sorbent materials or the substrates containing parent nuclides. The solution (eluent) used for column elution of the target radionuclides are usually the saline or pure water.

The column packing materials used in DFCC-based $^{188}$Re generators for immobilizing parent nuclide $^{188}$W can be classified into two following groups: Sorbent materials, which will be post-loaded with parent nuclide $^{188}$W in similar manner as discussed above in relation to $^{99}$Mo; and W-substrates analogous to the Mo-substrates discussed above. This situation is the cause of unwanted large volume and dilute concentration of the target nuclide eluate produced from the DFCC method-based $^{188}$Re generators. Hence, the radionuclide generator production technology needs further development to overcome or ameliorate the above outlined disadvantages of existing DFCC method-based radionuclide generators for improvement of generator performance.

Conventional Direct Flow Column Chromatographic Method and its Use in Radionuclide Generator Technology Conventional column chromatography, in full description is the direct flow column chromatographic (DFCC) method. This is a basic separation technique in chemical separation and was developed a long time ago. This method is based on the direct flow elution of the chromatographic separation column, that is the flow of liquid eluent or gas is always in only one direction when passing through the column in all elutions. This method is being used widely today in all chemical separations. The basic of this method is based on the elution of the analytic compounds (species) of different retention affinity for column packing material to separate each from other species of separation-intended feed mixture. Currently the column chromatographic separation is performed by, first, loading the feed separating mixture of separation-intended species into a column packed with insoluble solid separation media (such as solid sorbent powders, ion-exchange materials, solid phase extraction materials, parenting solid media used in nuclide generator column being capable to generate the daughter nuclide species, and the solid-supported reagents and bio-substrates used in organic synthesis and biochemical synthesis processes, respectively) and then eluting the column with a direct flow of fluid (eluting solvent/solution) or gas to separate individual species to collect separately the target species from the waste component species.

For a good performance separation the direct flow elution technique applied in the DFCC method requires much longer chromatographic column packed with more separation media (packing material) compared to the length of the column segment (a loading zone or band) used for loading feed mixture of separation-intended analytic compounds prior to starting separation elution process. The size of the loading zone of the column depends on the thermodynamic and operation parameters of both the column and properties of packing material, such as the retention capacity and affinity for separation-intended compounds, the particle size of parking material powders, eluting solution flow rate, diffusion and mass transfer of the compounds. Usually an expanding diffused loading zone is experienced in the separation practice as a result of the negative influence of the above mentioned uncertainly controlled parameters. So a suitably long column is needed to protect the breakthrough of unwanted species and to achieve an effective separation during separation elution in following steps after loading the column. The sharpness of the loading zone should also be kept in mind to get better separation effectiveness for chromatographic separation practice.

Practically, the disadvantage of the increased length or size of the chromatographic column and decreased sharpness of the loading zone is an increase in eluate volume of the separated species. The larger the column the larger the volume of eluate that will be obtained. The more diffused and broader the loading zone the larger volume of eluate that results. The larger volume of the eluate makes the separated species concentration lower and less useful. Moreover, the disadvantages of the direct flow column chromatography are the limited life-time of the separation column and less effective separation performance in case of repeated separation required without an additional step of column regeneration.

Today the utmost important requirements of a daughter radionuclide solution being used in daily clinical practice are its low production cost, sustainable supply, high purity and high concentration. The low production cost and sustainable supply of a daughter radionuclide solution relies on radionuclide generator technology using suitable parent radionuclide of low specific radioactivity.

In general, and particularly in radionuclide generator technology based on a conventional direct flow column chromatographic (DFCC) method, the use of low specific radioactivity parent radionuclide for production of an eluate of high daughter radionuclide concentration and purity requires a separation column of high parent radionuclide loading and a larger purification column of high purification efficiency. However, the technical problems and disadvantages of this technological approach are the followings:

1) A separation column with high loading of parent radionuclide results in:
   a) a larger spreading of diffused parent nuclide loading (adsorption) band of the column bed. As a result, the elution volume of daughter radionuclide will be increased and accordingly a lower concentration of daughter radionuclide eluate will be produced;
   b) an elevated level of parent nuclide breakthrough to be removed by purification column.
2) A larger purification column of increased contaminant-adsorption capacity for preventing the leachable contaminants to provide a high purification efficiency results in:
   a) a decreased fluid flow rate and reduction of capacity due to poisoning issue;
   b) a build-up of contaminants reducing the effective contaminant-adsorption capacity and a high potential leaching of contaminants having been retained in the purification column with increasing elution/operation time;
   c) an increased eluate volume of daughter radionuclide and accordingly a lower concentration of daughter radionuclide eluate will be produced;

It is the object of present invention to solve the problems mentioned above to substantially overcome or at least ameliorate one or more of disadvantages of the conventional direct flow column chromatographic (DFCC) method, particularly, currently used DFCC-method-based radionuclide generator technology.

SUMMARY OF THE INVENTION

An object of the present invention is a new chromatographic apparatus (alternating flow chromatography apparatus) and new separation-purification method of use (alternating flow chromatography method) to maximize the loading capacity of a separation column with non-diffused loading zone (or a loading zone of maximal sharpness) and to increase the purifying effectiveness of a purification column.

The apparatus comprises a new design of a separation column suitable for a new loading technique to maximize the loading capacity of the separation column with a non-diffused loading zone, and particularly in radionuclide generator technology to maximize the parent radionuclide loading of a generator column packed with sorbent of suitable parent nuclide adsorption capacity, and purification columns with new column design suitable to a new separation-purification method (alternating flow chromatography method) to increase the effectiveness of the purification process of minimal eluate-dilution effect of sorbent bed with fluid flow control components (alternating flow valve, feed eluent ports, parent nuclide loading ports, eluate output port and fluid flow driving force).

In one form, although it need not be the only or indeed the broadest form, the invention resides in an alternating flow column chromatography (AFCC) apparatus for chromatographic separation and chromatographic purification of ionic radionuclide components and chemical components soluble in a solution comprising:
a chromatographic separation column of 'U' shape or modified 'I' shape, including at least one loading port for loading of components for separation; a first purification column in fluid communication with one end of the separation column and a second purification column in fluid communication with another end of the separation column;
at least one eluent input port;
an eluate output port; and
an alternating flow valve in fluid communication with the primary eluent input port, the eluate output port, the first purification column and the second purification column wherein, when operated, the alternating flow valve reverses the flow of eluent through the purification columns and the separation column.

One of the at least one eluent input ports is suitably a primary eluent input port and there are suitably one or more specific eluent input ports.

At least one of the at least one loading ports is preferably disposed at the centre of the chromatographic separation column. Other loading ports are disposed at the end of the separation column.

Suitably the chromatographic purification columns are identical.

The apparatus suitably comprises a specific eluent input port in addition to the primary eluent input port and an eluent selection valve for selecting between the primary eluent input port and the specific eluent input port.

Suitably the AFCC apparatus is setup in the format of an integrated device, preferably in a format of benchtop device operated by a limited vacuum driving force for eluent/eluate liquid flow communication without using differential pressure controllers.

Suitably the separation column is 'U' shaped. The separation column may be pre-packed with sorbent powders, and components for separation may be loaded via the loading port prior to separation. Alternately the separation column may be loaded with slurry of solid substrate powders containing components for separation through the loading port. Suitably the loading port is a central loading port and there is a pair of loading ports, one at each end of the separation column, so that components may flow through from the central loading ports to the end loading ports. Loading may also occur in the reverse direction, from the ends to the centre, or from end to end.

There may be more than one purification column at each side of the separation column.

The alternating flow valve may be operated manually, electrically, pneumatically or hydraulically. In one form the alternating flow valve is operated automatically according to a predetermined programme. The apparatus suitably comprises a processor for operating the alternating flow valve.

Suitably the columns are packed with column packing materials comprising inorganic or organic solid sorbent or inorganic or organic solid substrate having an affinity for at least one component of the components for separation and very little or no affinity for at least another component of the components for separation.

Suitably the ionic components for separation are ionic molecules of size <2.5 nm (<25 Å) soluble in an aqueous solution.

Suitably the ionic components for separation may be radioisotopes. Preferably the radioisotopes are a parent radionuclide and a daughter radionuclide.

In a further form, although again not necessarily the broadest form, the invention resides in a method of alternating flow column chromatography in an alternating flow column chromatography apparatus comprising: a separation column including at least one loading port for loading of components for separation; a first purification column in fluid communication with one end of the separation column and a second purification column in fluid communication with another end of the separation column; at least one eluent input port; an eluate output port; and an alternating flow valve in fluid communication with the eluent input port, the eluate output port, the first purification column and the second purification column including the steps of:
loading the separation column with sorbent powder and components for separation;
delivering eluent through the alternating flow valve and the purification columns to the separation column;
eluting eluate of a desired component from the separation column;
collecting the eluate of desired component; and
periodically operating the alternating flow valve to reverse the direction of the flow of primary eluent through the purification columns and the separation column.

Suitably the method is for:
(a) a consecutive separation-purification elution to collect the eluate of product (desired) component from the product-generating component immobilized on the separation column (without repeating the step of loading components for separation, i.e. one loading of separation components for several repeated elutions of product component.) for the whole life time of the product-generating component; or
(b) a consecutive separation-purification elution to collect the eluate of product (desired) component from an oncoming sample loading of the components to be separated without post-elution regeneration of the purification columns.

The method suitably includes the steps of repeatedly reversing the flow of eluent for each elution.

Suitably the ionic product-generating component or one of the components to be separated is immobilized in the separation column at the loading step and then at the separation elution step as well.

The step of loading the separation column may be by solution loading or slurry loading.

In a still further form, the invention resides in a radionuclide generator comprising:
a generator column of U-shape or modified I-shape, including:
a loading port for loading of radioisotopes for separation;
a first purification column in fluid communication with one end of the generator column and a second purification column in fluid communication with another end of the generator column;
a primary eluent input port;
an eluate output port; and
an alternating flow valve in fluid communication with the primary eluent input port, the eluate output port, the first purification column and the second purification column wherein, when operated, the alternating flow valve reverses the flow of eluent through the purification columns and the generator column.

Preferably the loading port is disposed at the centre of the generator column.

Suitably the chromatographic purification columns are identical.

The apparatus suitably comprises a specific eluent input port in addition to the primary eluent input port and an eluent selection valve for selecting between the primary eluent input port and the specific eluent input port.

The radionuclide generator suitably incorporates radiation shielding.

Suitably the AFCC-based radionuclide generator is setup in the format of an integrated device, preferably in a format of benchtop device operated by a limited vacuum driving force for eluent/eluate liquid flow communication without using differential pressure controllers.

In a yet further form the invention resides in a method of radionuclide generation in an alternating flow column chromatography apparatus comprising:
a generator column including a loading port for loading of parent radionuclide; a first purification column in fluid communication with one end of the generator column and a second purification column in fluid communication with another end of the generator column;
a primary eluent input port;
an eluate output port; and
an alternating flow valve in fluid communication with the eluent input port, the eluate output port, the first purification column and the second purification column including the steps of:
loading the generator column with sorbent powder;
immobilizing the ionic parent radionuclide (a product-generating component) in the generator column;
delivering eluent through the alternating flow valve to the purification columns and generator column;
eluting eluate of daughter radionuclide (product component) from the generator column and purification columns;
collecting the eluate of daughter radionuclide; and
periodically operating the alternating flow valve to reverse the direction of flow of primary eluent through the purification columns and the generator column for a consecutive elution-purification process and repeating the elution steps of eluting eluate for collecting the eluate of daughter radionuclide (without repeating the step of immobilizing the ionic parent radionuclide,) for the whole life time of the parent radionuclide and/or for whole the life time of a medically useful radionuclide generator.

The method may further include the step of sterilizing the sorbent powder before loading or sterilizing the generator column with sorbent powder after loading.

The step of loading the generator column may be by solution loading or slurry loading.

BRIEF DESCRIPTION OF THE DRAWINGS

Notwithstanding any other forms which may fall within the scope of the present invention, preferred embodiments of the present invention will now be described, by way of examples only, with reference to the accompanying drawings in which:

FIG. 1 shows a schematic representation illustrating a prior art system setup of conventional direct flow column chromatography (DFCC);

FIG. 2 shows a schematic representation illustrating a prior art setup of improved direct flow column chromatography (IDFCC);

FIG. 3 shows a schematic representation illustrating a first embodiment of an alternating flow column chromatography (AFCC) setup according to the present invention;

FIG. 4 shows a schematic representation illustrating a second embodiment of an alternating flow column chromatography (AFCC) setup according to the present invention;

FIG. 13 shows schematics depicting three operations of the AFCC apparatus.

DETAILED DESCRIPTION

Figure 5:
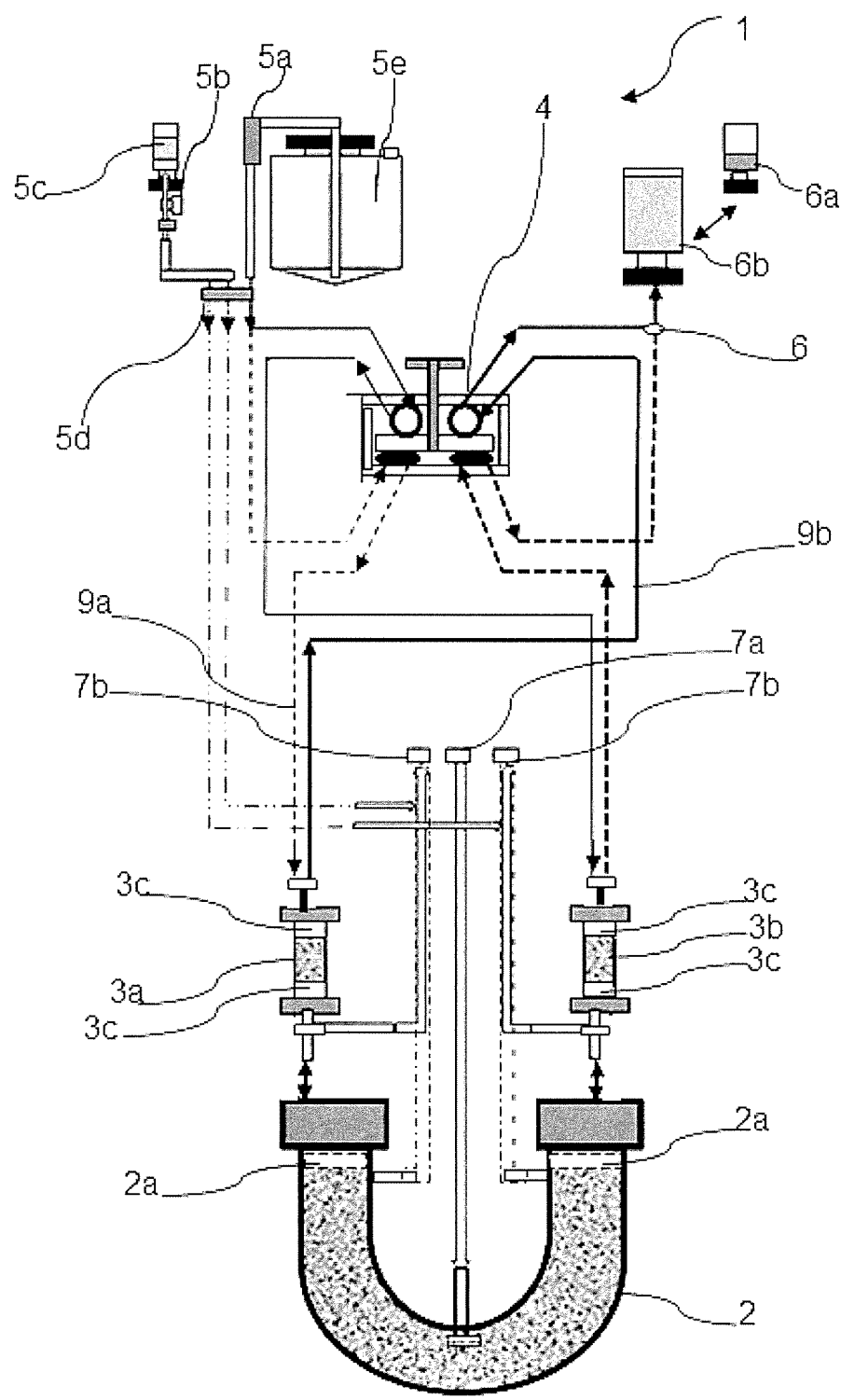
FIG. 5 shows a schematic representation illustrating greater detail of the second embodiment of an alternating flow column chromatography (AFCC) of FIG. 4.

Referring to FIG. 1, there is shown a prior art Direct Flow Chromatography Column (DFCC). As is known in the art, the DFCC flow of eluting fluid (liquid or gas) runs in one direction all the time. FIG. 2 shows a known improved direct flow column chromatography (IDFCC) that separates the separation column from a following purification column and allows for independent loading of the separation column. However, the IDFCC still has flow of eluting liquid or gas running in one direction all the time.

In FIG. 1 there is shown a separation column (SC) for capturing and retaining a mixture of species needed to be separated. The eluent enters at the top of FIG. 1 and flows through a loading zone (LZ) to a separation/purifying zone (PZ) and hence exits as eluate, as described above in the background section. In FIG. 2 there is shown a separation column (SC) loaded with the solid substrate powders containing the parent radionuclide and daughter radionuclide components and a following purification column (PC). As with the prior art embodiment of FIG. 1, the eluent enters at the top of FIG. 2 and flows through the separation column (SC) before flowing through the purification column (PC). The embodiment of FIG. 2 also permits separate loading of the separation column (SC).

A first embodiment of an alternating flow column chromatography (AFCC) apparatus for the chromatographic separation and chromatographic purification of the ionic radionuclide components and chemical components of size <2.5 nm (<25 Å) soluble in an aqueous solution is depicted schematically in FIG. 3.

The composition to be separated is a mixture of ionic desired (target or product) components, ionic product-generating components and ionic contaminant components (including the breakthrough of ionic product-generating components leachable from the separation and purification columns into eluate flow). The components (species) of the composition to be separated are ionic and/or non-ionic molecules of size <2.5 nm soluble in an aqueous solution. The product component may be generated from a product-generating component as a result of chemical, biochemical and nuclear (radiochemical) decomposition processes. The decomposition process may be an in-situ process occurring inside of the separation column loaded with ionic product-generating component or a process occurring outside of the separation column. The decomposition process may be a spontaneous radioactive decay of a parent radionuclide (an ionic product-generating component) to generate a daughter radionuclide (an ionic product component).

In broad terms the apparatus 1 consists of a separation column 2, a pair of purification columns 3a, 3b, and an alternating flow valve 4. The alternating flow valve 4 is operated to reverse the direction of eluent flow from feed eluent port 5 to eluate collection port 6 through the columns 2, 3a, 3b. A mixture of components to be separated may be loaded through a separation column loading port 7, as described in greater detail below.

The alternating flow valve 4 may take any appropriate form to achieve the reversible flow as described. Various options are described below. The alternating flow valve 4 operates in a first position to direct eluent (liquid or gas) from feed eluent port 5 to purification column 3a, through the separation column 2 and purification column 3b to eluate collection port 6 following the path indicated by the dotted arrow 9a and solid arrow 9b. In a second position the alternating flow valve 4 operates to direct eluent from feed eluent port 5 to purification column 3b, through the separation column 2 and purification column 3a to eluate collection port 6 following the path indicated by the solid arrow 9c and dotted arrow 9d. It will be appreciated that changing the alternating flow valve 4 between the first position and the second position reverses the direction of flow of eluent through the apparatus that achieves the various advantages outlined below.

The separation column is loaded with a composition to be separated. One or more component(s) of the composition is preferentially retained by the separation column, as is known. The desired component is washed through by the eluent and collected at the eluate port. The purification columns preferentially retain any of the first component(s) that break through from the separation column. The alternating flow valve reverses the direction of flow of eluent so that with each flow reversal the upstream purification column is regenerated and the everclean purification columns together with a larger volume of fully component-loaded separation column are actively used for a larger separation capacity.

FIG. 4 shows a second embodiment of an alternating flow column chromatography (AFCC) apparatus which is essentially equivalent to the first embodiment of FIG. 3 except that the separation column 2 is configured in a 'U' shape instead of the 'I' shape of FIG. 3. In other respects the components and operation are the same.

In order to better describe the invention a more detailed illustration of a third embodiment of an alternating flow column chromatography (AFCC) apparatus is shown in FIG. 5. Suitably the AFCC apparatus is setup in the format of an integrated device, preferably in a format of benchtop device operated by a limited vacuum driving force for eluent/eluate liquid flow communication without using differential pressure controllers.

As with the first and second embodiments, the apparatus 1 consists of a separation column 2, a pair of purification columns 3a, 3b, and an alternating flow valve 4. In the third embodiment, the separation column 2 has a 'U' shape, although it could also be configured with an 'I' shape. The alternating flow valve 4 is operated to reverse the direction of the eluent flow from feed eluent port 5 to eluate collection port 6 through the columns 2, 3a, 3b. A mixture of species to be separated may be loaded through a central separation column loading port 7a or through loading ports 7b at either end of the separation column. Depending on the favourable adsorption properties of the components to be separated, especially the product-generating component, for the sorbent packed in the column body, the loading ports 7b disposed at the two ends of the sorbent/substrate bed may be preferred over the centre inlet loading port 7a disposed at the centre of the body for loading solid substrate powders containing components to be separated. Typically sorbent or substrate powders of particle size from 50 μm to 200 μm are disposed in the column body. There may also be liquid permeable restrictors 2a disposed at both ends of the sorbent or substrate powder bed of the separation column 2 for preventing exit of the sorbent or substrate powders from the column body. Restrictors 3c may also be provided for the purification columns. The restrictors may be sintered glass frits, plastic frits or some other type of frit.

The chromatographic separation column is packed with the sorbent powders or solid substrate powders for chemically immobilizing ionic product-generating molecules or one of the components and other ionic contaminant components. The chromatographic separation column has low affinity (preferably no affinity) of retaining the ionic desired (product) component.

In the third embodiment of FIG. 5 there is provided a primary eluent port 5a and a specific eluent port 5b. Providing two (or more) eluent ports allows for more than one eluent to be used in operation of the AFCC. For instance, a primary eluent may be used for elution through the separation column and purification columns or a specific eluent may be used for just purification. The primary eluent is held in reservoir 5e and the specific eluent is held in vial 5c. An eluent selective valve 5d allows for selection of the desired eluent and directs the selected eluent to either purification column 3a, 3b or directly to the separation column 2, as desired. The eluent selective valve 5d is suitably a 2-way triple-port pinch valve.

FIG. 5 also shows eluate collection vials 6a, 6b which can be removed from the eluate collection port 6.

The separation column may be loaded according to a "sorbent packing" approach or a "substrate loading" approach. The sorbent packing approach means the separation column is pre-packed with sorbent powders but the composition to be separated is not loaded till a subsequent step, preferably just before separation. In this approach the composition for separation is delivered through the loading port 7a, which is at the centre of the column, and excess flows out through loading ports 7b. This approach may be referred to as "solution loading" (SOLP) as only the composition to be separated is loaded as a solution. The substrate loading approach means the empty separation column is loaded with substrate powders containing immobilized composition to be separated. To facilitate filling the empty separation column with solid powder, slurry with water is formed. The slurry of water and substrate powders containing immobilized composition to be separated is sucked into the separation column through loading ports 7b by a limited vacuum applied to the port 7a and excess flows from port 7a. This approach may be referred to as "slurry loading" (SULP) as the composition immobilized in substrate powders are loaded as slurry. The dry substrate powders can be loaded into the separation column (SC) using a limited vacuum applied to the outlet of loading port 7a.

In one embodiment, the chromatographic separation column according to the invention is fully loaded with the mixture of components to be separated and has a sharp loading zone (band) to minimize the column volume (loading effective zone) where the mixture of components is present. The small loading zone applicable in the AFCC method offers a reduction in the eluent volume needed to remove/separate the target species from the mixture of components. A small loading zone is hard to achieve in the conventional prior art DFCC procedure.

The chromatographic purification columns may be purposely designed to enable and to be effectively used for reverse-forward alternating the direction of eluent flow in the column. For instance, the sorbent powders may be chosen with particle size from 30 µm to 150 µm disposed in the column body for specific purpose. The chromatographic purification columns are packed with sorbent powders to immobilizes and/or retains the ionic contaminant components including a small amount of breakthrough of product-generating component leachable from the separation column. The chromatographic purification column has low affinity (preferably no affinity) of retaining the ionic desired (product) component.

In the AFCC method two purification columns of small diameter and reasonably long length, loaded with a relatively small weight of sorbent of small size and connected to both ends of the separation column, play a role of further purification of the desired (product) component separated by the separation column, and are regenerated (cleaned up) by the fresh feed primary eluent each time the eluent flow is reversed by operation of the alternating flow valve. The finer particle size sorbent powders packed in the purification column offers more effective retaining of contaminant components from the eluate flow. A longer length of the purification columns packed with reasonable small weight of sorbent powders of smaller particle size offers an elution with smaller eluent volume and a longer traveling time of contaminant components along the column giving higher probability of contacting with sorbent powders for retaining the contaminant components in a trace quantity from the eluate flow.

Figure 12A:
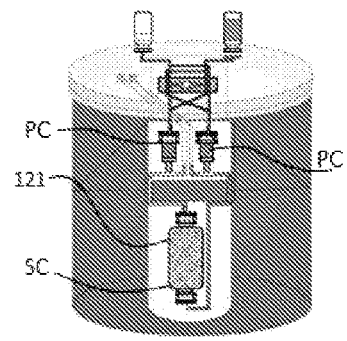
FIG. 12 depicts various configurations of an alternating flow column chromatography apparatus.
Figure 12B:
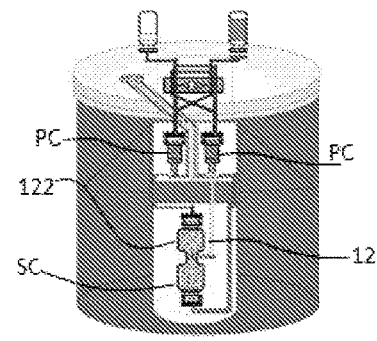
Figure 12C:
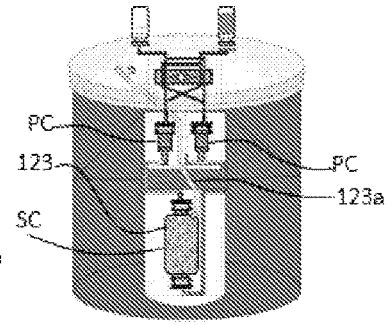
Figure 12D:
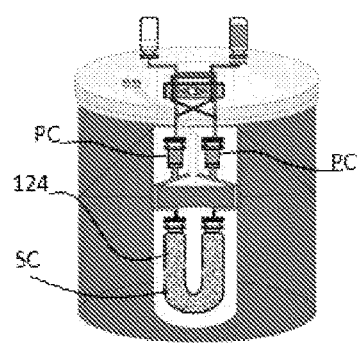
Figure 12E:
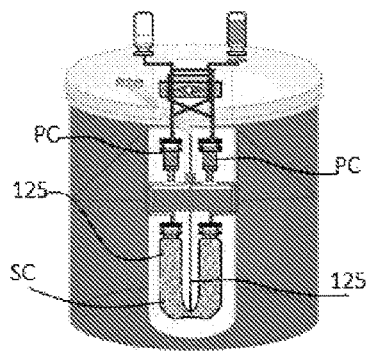
Figure 12F:
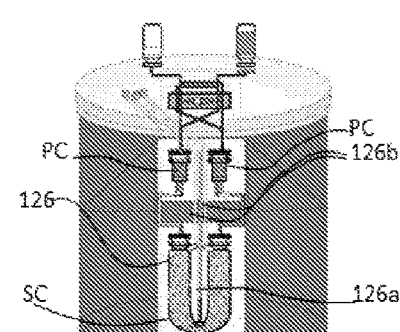
Figure 12G:
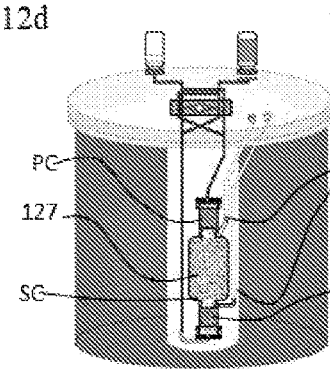
Figure 12H:
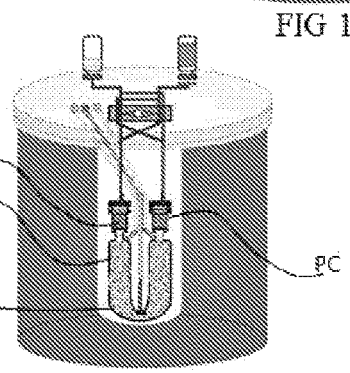

The embodiment of FIG. 5 shows the separation column 2 communicating with the purification columns 3a, 3b via tithes or pipes. The columns could be directly connected as per the example in FIG. 12g and FIG. 12h, discussed later.

As with the first embodiment (as shown in FIG. 3), the alternating flow valve 4 operates in a first position to direct eluent (liquid or gas) from feed primary eluent port 5a to purification column 3a, through the separation column 2 and purification column 3b to eluate collection port 6 following the path indicated by the dotted arrows 9a. In a second position the alternating flow valve 4 operates to direct eluent from feed primary eluent port 5a to purification column 3b, through the separation column 2 and purification column 3a to eluate collection port 6 following the path indicated by the solid arrows 9b. In operation, the alternating flow valve 4 is repetitively switched between the first position and the second position to repeatedly reverse the direction of flow of eluent through the apparatus to achieve the various advantages discussed herein.

The eluent-selective valve 5d connects to the primary eluent port 5a and the specific eluent port 5b to the alternating flow valve and to the loading ports 7b. The valve is being functioned in the operation of the multiple further purifications with several specific eluents and/or the elution of the product component from a purification column with a specific eluent for increasing the concentration of the product component. The inclusion of the specific eluent port 5b and the eluent selective valve 5d in the apparatus offers a capability of eluent variation and increasing the operation functions of AFCC apparatus resulting in advantageous features such as separation of desired (product) component of improved purity and higher concentration.

An example of the use of the additional eluent port and selective valve is shown in FIG. 13. The following items are shown in the figures:

| | |
|---|---|
| ST-1 | Operation step 1 |
| ST-2 | Operation step 2 |
| ST-3 | Operation step 3 |
| SC | Separation Column |
| PC-1 | Purification Column 1 |
| PC-2 | Purification Column 2 |
| PE | Primary Eluent |
| SE-1 | Specific Eluent 1 |
| SE-2 | Specific Eluent 2 |
| W | Waste |
| DE | Daughter radionuclide product Eluate |
| Pb | Lead radiation shielding |

Figure 13A:
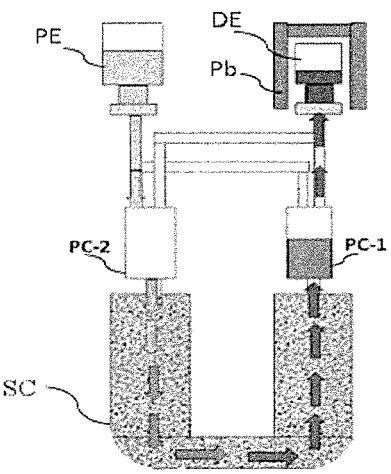
FIG. 13a depicts operational function 1 of a standard elution of a desired product (component).
Figure 13B:
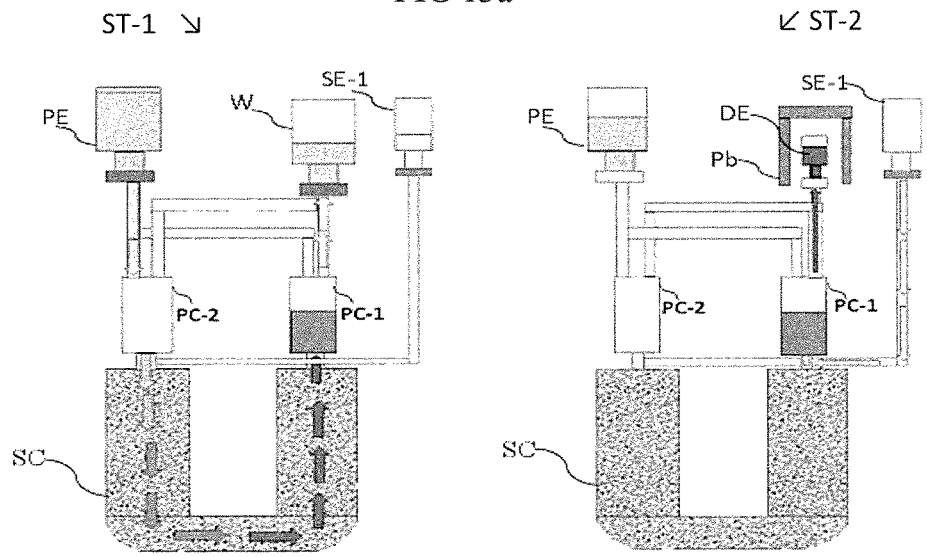
FIG. 13b depicts operational function 2 of a selective elution of a purified product (component).

There are three steps depicted, they are:
a) Standard elution of desired (product) component as shown in FIG. 13a. This process involves eluting the desired component with a primary eluent from the separation column through one of the purification columns to an eluate output port while retaining the contaminant components in the purification column;
b) Selective elution of purified product component from as shown in FIG. 13b. This process is performed when both the product component (e.g. daughter radionuclide in a radionuclide generator) and contaminant components (including the breakthrough of product-generating component) separated by a primary eluent from the separation column (e.g. a radionuclide generator column loaded with parent radionuclide) are retained on the purification column, as depicted in Step 1. In step 2, a specific eluent is put to use in replacing the primary eluent by actuating the eluent selective valve 5d for selectively eluting the specific eluate of desired (product) component from the purification column into a specific eluate receptacle. The contaminants including the breakthrough of product-generating component are kept retained on the purification column. The product-generating component is immobilized in the separation column.

c) Further purification of the product component with specific eluents and selective elution of purified product component from purification column with purposely used specific eluent is shown in FIG. 3c. This process is performed when both the product component (e.g. daughter radionuclide in a radionuclide generator) and contaminant components (including the breakthrough of product-generating component) separated by a primary eluent from the separation column (e.g. a radionuclide generator column loaded with parent radionuclide) are retained on the purification column during elution in Step 1. In step 2 a further purification is performed with a specific eluent put into use in replacing the primary eluent by actuating the eluent selective valve 5d. By this operation the specific eluent passes through the purification column to remove the contaminants from the purification column into an evacuated waste container located at the eluate port while keeping the desired (product) component further retained on the purification column. In step 3 a specific eluent is used for eluting the specific eluate of desired (product) component from the purification column into a specific eluate receptacle. The product-generating component is immobilized in the separation column and a possible breakthrough of product-generating component is not retained by the purification column.

As will be appreciated, the steps are essential the same with reversal of the flow.

Figure 13C:
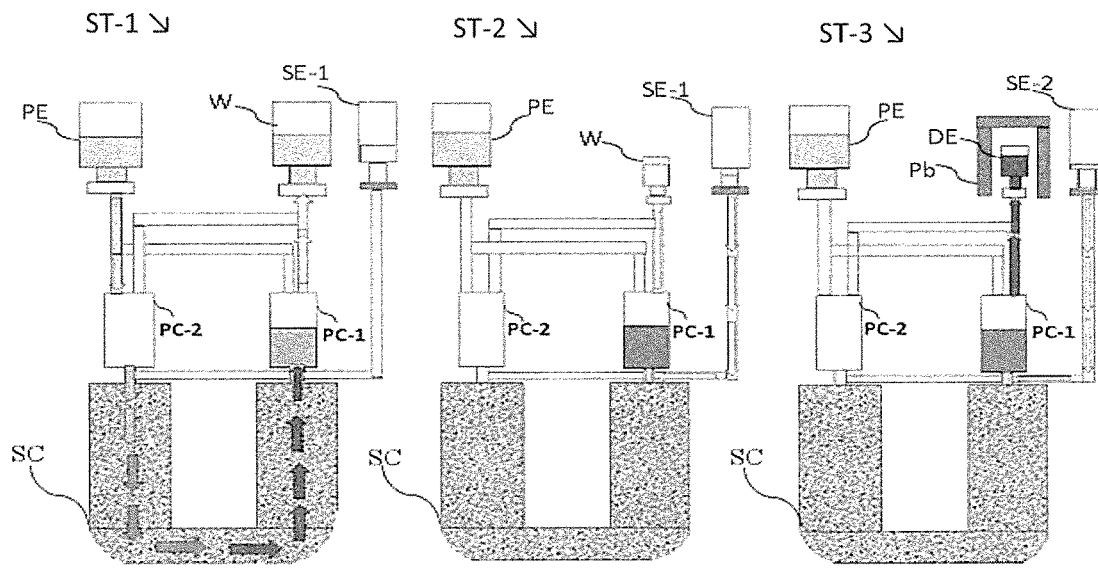
FIG. 13c depicts operational function 3 of a further purification and selective elution of purified product (component)

By way of summary, the functions shown in FIG. 13a, FIG. 13b and FIG. 13c are:

Function 1: Eluting the desired component with a primary eluent from the separation column through one of the purification columns to an eluate output port while retaining the contaminant components in the purification column;

Function 2: Eluting the desired component with a primary eluent from the separation column to move the desired component to be retained on a purification column, then recovering the eluate with a specific eluent from the purification column;

Function 3: Eluting the desired component with a primary eluent from the separation column to move the desired component to be retained on a purification column, then further purifying the desired component with a specific eluent and eluting the eluate of desired component from the purification column with another specific eluents.

The AFCC apparatus and method has a number of advantages compared to the DFCC and IDFCC techniques described above. These include that the regeneration of the purifying/separating zone by reversal of flow, non-spread sharp-cut analytic species loading zone, reduced eluent volume requirement and more effective separation.

Figure 6:
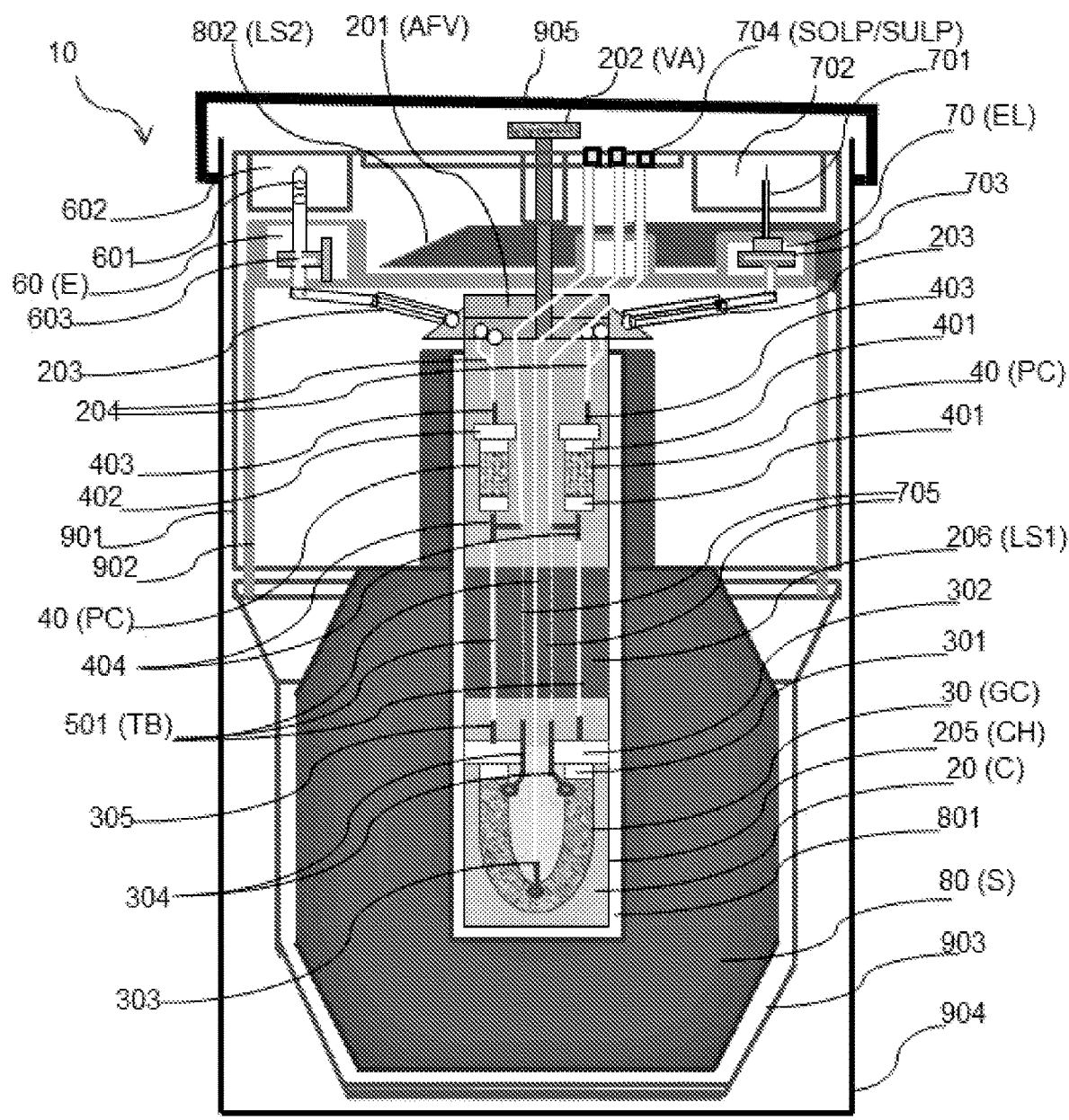
FIG. 6 shows a schematic representation illustrating a cross-sectional view of a radionuclide generator using the alternating flow column chromatography apparatus of FIG. 5.

The invention may be applied to various chemical, nuclear/radiochemical and biochemical separations such as preparative chromatographic separation, solid phase catalysis or solid-supported reagents based organic synthesis, analytical chemistry separation, biochemical separation of bioproducts generated from the enzymatic reaction of enzyme coated on solid particle surface enzyme, and particularly radioisotope separation in radionuclide generator production technology. FIG. 6 shows an embodiment of the alternating flow column chromatography apparatus that is particularly suited to radionuclide generation.

Referring to FIG. 6, there is provided a radionuclide generator 10 for generating a solution of an ionic radioactive isotope product component (daughter radionuclide). The generator design is based on the AFCC apparatus described according to the third aspect of the invention. It comprises a separation (generator) column 30 (GC), the generator having an ionic product-generating radioactive isotope component (parent radionuclide) retained on the column packing material thereof. The parent radionuclide is such that it decays to produce a daughter radionuclide and the parent radionuclide has a greater affinity for the column packing material than the daughter radionuclide does. The radionuclide generator further comprises two purification columns 40 (PC) which are packed with a sorbent adapted for selectively retaining the parent radionuclide and other contaminant component. The radionuclide generator further comprises an alternating flow valve 201 (AFV) for reversing the flow of eluent when a consecutive elution is performed. The radionuclide generator may also comprises a specific eluent input port and an eluent selective valve as shown in FIG. 5.

The alternating flow column chromatography based radionuclide generator is setup in the format of integrated device, preferably in a format of benchtop device by a limited vacuum driving force for eluent/eluate liquid flow communication without using differential pressure controllers.

Further detailed elements of the radionuclide generator are set out in the following table. In particular, the generator column 30 is embodied as a generator cartridge 20 so that it may be easily removed and reinserted in the generator 10. The cartridge 20 is held in a cartridge chassis 205 which has lead shielding 206. The loading port 704 is configured for either solution loading or slurry loading. The generator is constructed in a convenient package which may be transported with carry handle 905. Other elements are discussed below.

| Numbers | Assignment |
| --- | --- |
| 10 | Radionuclide generator |
| 20 (C) | Generator cartridge |
| 201(AFV) | Alternating Flow Valve |
| 202 (VA) | Valve actuating means |
| 203 | T connector of the Alternating Flow Valve |
| 204 | T connector of the Alternating Flow Valve |
| 205 (CH) | Cartridge chassis |
| 206 (LS1) | Local lead shielding of the generator cartridge |
| 30 (GC) | Generator column |
| 301 | Frit of the generator column |
| 302 | Aluminium-capped septum stopper of the generator column |
| 303 | Connector of the loading port (optional) used as an inlet for loading a generating (parent) radionuclide solution and as an outlet for loading a generating (parent) radionuclide-substrate material. |

-continued

| Numbers | Assignment |
| --- | --- |
| 304 | Connector of the loading port used as an inlet for loading the generating (parent) radionuclide-substrate material, in case. |
| 305 | Connector end of the Generator column |
| 40 (PC) | Purification column |
| 401 | Frits of the purification columns |
| 402 | Aluminium-capped septum stopper of the purification column |
| 403 | Connector end of the purification column |
| 404 | T- connector end of the purification column |
| 501 (TB) | Tubes connecting the purification column and generator column |
| 60 (E) | Feed eluent port |
| 601 | Vented spike of the Feed eluent port |
| 602 | Guide hole for eluent vial |
| 603 | Millipore filter of the Vented spike |
| 70 (EL) | Eluate collection port |
| 701 | Needle of the eluate collection port |
| 702 | Guide hole for eluate vial |
| 703 | Millipore filter of the eluate collection port |
| 704(SOLP/SULP) | Loading port for the generating (parent) radionuclide solution (SOLP) and/or for the generating radionuclide-substrate material (SULP). |
| 705 | Tubing for loading the generating radionuclide-substrate material, in case. |
| 80 (S) | Radiation shielding means of the generator body |
| 801 | Internal volume of the generator body |
| 802 (LS2) | Local radiation shielding means |
| 901 | Guide cover for the ports |
| 902 | Support of the ports |
| 903 | Support of the radiation shielding means of generator body |
| 904 | Can of the generator |
| 905 | Means of carrying |

A wet or dry elution technique may be applied to elute daughter radionuclide from the generator. Preferably, dry elution technique is applied to avoid diluting the eluate with the residual eluent present in the tubing connection.

Figure 7:
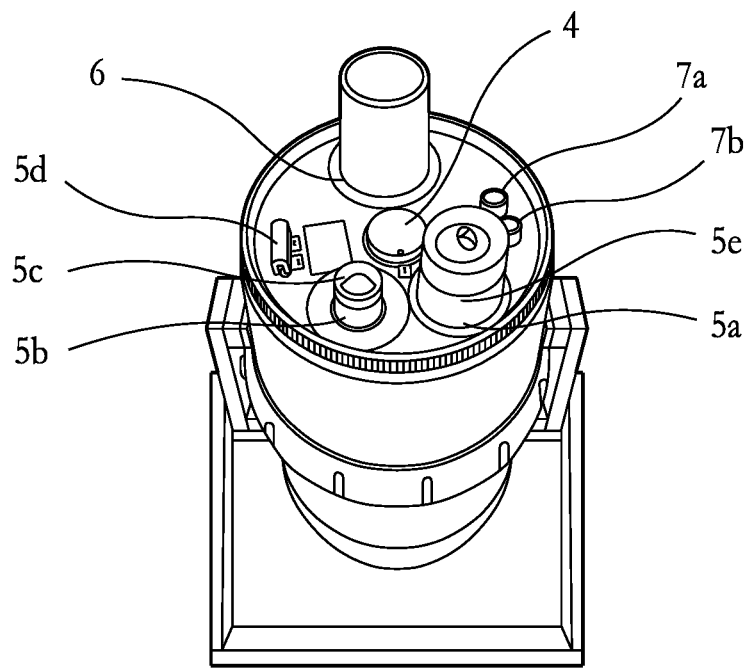
FIG. 7 shows a photo of a radionuclide generator composed of a generator cartridge disposed in the internal volume of the generator body according to the schematic of FIG. 6.
Figure 8:
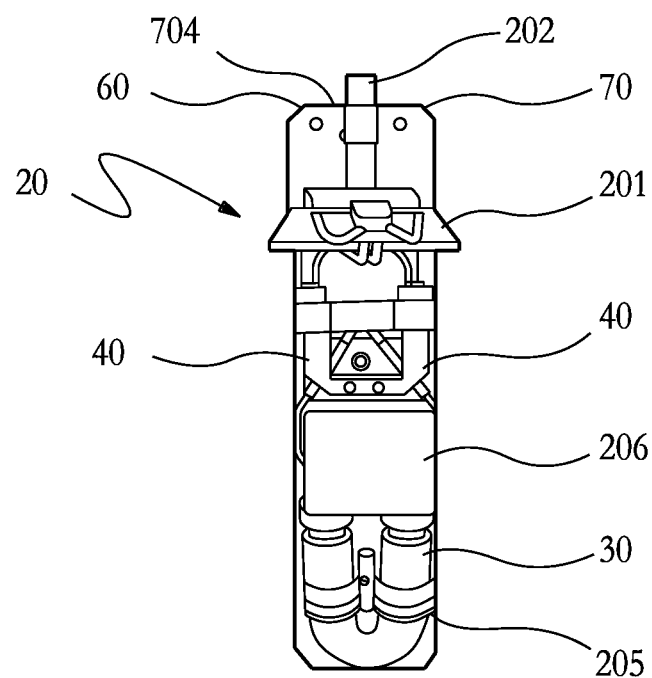
FIG. 8 is a photograph of the generator cartridge of FIG. 7.

To assist with understanding the nature of the radionuclide generator embodiment two photographs are provided as FIG. 7 and FIG. 8. Similar elements carry the same indicia as shown in FIG. 5, FIG. 6 and listed in the table above. As shown in FIG. 7 a radionuclide generator includes a generator cartridge which is shown in FIG. 8.

In use, auto-regeneration of the purification columns is performed by reversing the eluent flow in consecutive elution resulting in a longer life-time of the radionuclide generator.

The packing material of coarse particle size for the generator column and the sorbent of fine particle size for the purification columns are used for benefiting a good flow dynamics and highest purification/elution performance giving a small volume of daughter radionuclide eluate (higher concentration of daughter radionuclide) of high purity.

Advantageously, the generator column is packed with a sorbent adapted for being fully loaded with the parent radionuclide as a product-generating radionuclide source. The sorbent is adapted for selectively retaining the parent radionuclide as a product-generating radionuclide source, or being packed with a parent-radionuclide-substrate material having selectively immobilized product-generating radionuclide ion in the substrate. The column packing material comprises an inorganic or organic solid sorbent or inorganic or organic solid substrate containing parent radionuclide immobilized in the solid material matrix. Preferably, the inorganic sorbent or inorganic solid substrate has no (or very little) affinity to retarding the daughter radionuclide of the parent radionuclide in use. Preferably, the inorganic sorbent or inorganic solid parent-nuclide-substrate is in powder form of particle size from 50 µm to 200 µm or of mean particle size from 60 µm to 100 µm.

The generator column 30 is usefully in the form of 'U' tube but an 'I' tube is also effective. As with the earlier embodiment the parent nuclide loading ports are located at both ends of the generator column and/or at the middle of the generator column. Two ends of the generator column are connected in series to two purification columns (which may be identical). The arrangement provides for flexibility in the nature of radionuclide parent loading of the column 30. The generator column may be suitable for separation of radioactive ions. The housing, the body, the restrictors, the loading port and the bifunctional outlet-inlet connectors may all be constructed from materials that are not degraded by radiation of parent radionuclide and daughter radionuclides and by the gamma-radiation and autoclaving steam-temperature applied for sterilization of the generator columns.

The purification columns 40 are packed with a sorbent adapted for selectively retaining the parent radionuclide and other contaminant components.

The purification columns comprise a column packing material for selectively retaining the parent radionuclide from the eluate of the daughter radionuclide of the parent radionuclide in use. Suitably the column packing material comprises an inorganic or organic solid sorbent which has no (or very little) affinity to retard the daughter radionuclide of the parent radionuclide in use. Preferably, the inorganic or organic solid sorbent used in the purification columns is in powder form of particle size from 30 µm to 150 µm or of mean particle size from 40 µm to 70 µm. The purification column may be suitable for purification of radioactive ions. The housing, the body, the restrictors, the bifunctional outlet-inlet connectors may all be constructed from materials that are not degraded by radiation of parent radionuclide and daughter radionuclides and by the gamma-radiation and autoclaving steam-temperature applied for the sterilization of the purification columns.

In one embodiment, the chromatographic separation column (generator column) of AFCC-based radionuclide generator according to the invention is fully loaded with the parent radionuclide and has a sharp loading zone (band) to minimize the column volume (loading zone) where the mixture of parent radionuclides and daughter radionuclides is present. The small loading zone applicable in the generator column offers a reduction in the eluent volume needed to remove/separate, the daughter radionuclides from the mixture of parent radionuclides and daughter radionuclides. A small loading zone is hard to achieve in the conventional prior art DFCC-based radionuclide generator.

In the AFCC-based radionuclide generator two purification columns of small diameter and reasonably long length, loaded with a relatively small weight of sorbent of small size and connected to both ends of the generator column, play a role of further purification of the daughter radionuclide separated by the generator column, and are regenerated (cleaned up) by the fresh feed eluent each time the eluent flow is reversed by operation of alternating flow valve. The finer particle size sorbent powders packed in the purification columns offers more effective retaining of contaminant components (including a breakthrough of parent radionuclide considered as main contaminant) from the eluate flow. A longer length of the purification columns packed with reasonable small weight of sorbent powders of smaller particle size offers an elution with smaller eluent volume and a longer traveling time of contaminant species along the column giving higher probability of contacting with sorbent powders for retaining the contaminant species in a trace quantity from the eluate flow.

Suitable sorbents are discussed later with respect to specific examples.

The generator column and purification columns are provided with support frits 301 and 401 of pore size between 20 μm to 50 μm at both ends of the column. Each end of generator column 30 is connected to one end of each purification column 40 using lead tubing 501(TB). In the alternative each end of generator column 30 may be connected directly to the one end of each purification column 40 without lead tubing.

The generator column 30 is provided with one feed eluent port 60(E) which is provided with a 0.22 μm Millipore filter 703 and a needle 701. The generator column 30 is also provided with one eluate collection port 70(EL) with a pin vented by a 0.22 μm Millipore filter 603.

Each purification column is connected to the alternating flow valve 201 which operates with two open-close channels. Each channel accommodates one upper line and one lower line for fluid (liquid or gas) flow. On one side of the valve two upper lines of the channels are connected via a T connector 203 which is itself connected to the feed eluent port 60 and two lower lines of the channels are connected via a T connector 203 which is connected to the eluate collection port 70. On the other side of the valve the upper line and lower line of the channels are connected via a T connector 204 which is connected to one end of each purification column. Another end of each purification column is connected to the end of the generator column via a T connector 204 which is connected to the loading port.

The whole apparatus 10, or at least the generator column 30 and purification columns 40, when prepacked with sorbent materials, is sterilized by gamma ray radiation. A pre-assembled sterile generator cartridge may be produced offering the sterile inline loading of parent nuclide into the generator thereby achieving a highly standardized production process. If not pre-packed and sterilized, the columns are loaded with sterile compositions.

As shown, the radionuclide generator device comprises a body 80 having an internal volume 801, the generator cartridge 20 being located substantially within the internal volume of the body in use. The body comprises shielding means for shielding at least the generator cartridge during use. The shielding means reduces the risk of possible exposure to the radionuclides. The radiation shielding material may be lead or tungsten or depleted uranium metal. The body comprises support means 902 for supporting the parent-nuclide loading port, eluate collection port, and feed eluent port on the upper part of the body in use.

In the particular embodiment shown, the alternating flow valve 201 includes a valve actuating means 202(VA) being configurable between a first position corresponding to the at least one valve being in the first open configuration and a second position corresponding to the at least one valve being in the second open configuration. Rotation of the valve actuating means 202 effects reversal of the flow direction.

It is preferable for the valve actuating means to be located externally of the body so that a user can manually transition the at least one valve between the first open configuration and the second open configuration by virtue of the valve actuating means. However, an alternate arrangement is to use hydraulic, pneumatic or electric actuation. It is also useful to automate the actuation for unsupervised operation of the radionuclide generator. For automatic operation of the alternating flow valve the times for reversal of the flow may be according to a programmed schedule determined for the specific elution.

Figure 9:
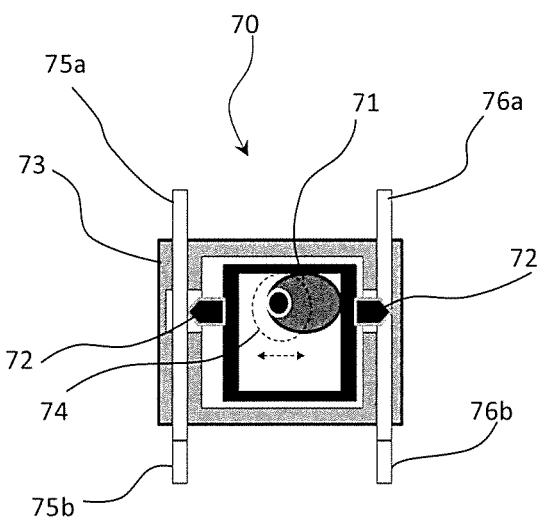
FIG. 9 shows a schematic of a first embodiment of an alternating flow valve.
Figure 10:
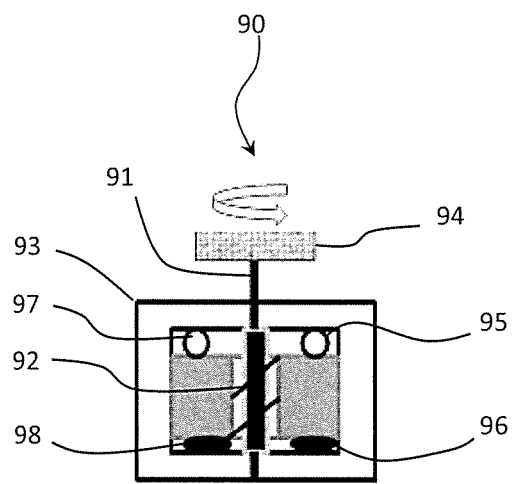
FIG. 10 shows a schematic of a second embodiment of an alternating flow valve.
Figure 11:
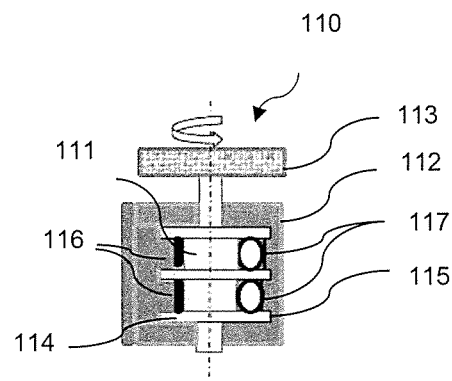
FIG. 11 shows a schematic of a third embodiment of an alternating flow valve.

Optional designs of the alternating flow valve are shown in FIGS. 9-11. Referring to FIG. 9, there is shown an alternating flow valve 70 incorporating an oval drive 71 with oval driven pinch means 72 in a body 73. The oval drive 71 is actuated by actuating means 74 to move the pinch means 72 into either a first channel 75 or a second channel 76. Only an upper pair of channels is visible in FIG. 9, but there are a second pair of lower channels that are actuated in the same manner.

FIG. 10 shows a second design of an alternating flow valve 90 in the form of a thread drive 91 with a thread-driven pinch means 92 in a body 93. The thread drive 91 is actuated by actuating means 94 to move the pinch means 92 to pinch either a first channel 95 or a second channel 96. The sketch of FIG. 10 also shows the corresponding channels 97, 98 that are not visible in FIG. 9.

FIG. 11 shows a third design of an alternating flow valve 110 in the form of a shaft drive with a peristaltic pinch shaft 111 in a valve body 112. The shaft drive 111 is actuated by actuating means 113 to turn the peristaltic pinch shaft 111 into either a first channel 114 or a second channel 115. A first pair of channel is visible with clamped tubes 116, but there is a second pair of channel that are actuated with the open tubes 117. The alternating flow valve 110 of FIG. 11 operates in similar manner to the first and second designs.

Referring generally to all designs, the alternating flow valve consists of two open-close channels. Each channel accommodates one upper line and one lower line for liquid or gas flow. On one side of the valve, two upper lines of the channels are connected via a T connector which is connected to the feed eluent port and two lower lines of the channels are connected via a T connector which is connected to the eluate collection port. On the other side of the valve, the upper line and lower line of the channels are connected via a T connector which is connected to one end of each purification column. Another end of each purification column is connected to the end of the separation column via a T connector which is connected to the loading port.

Although not shown in the figures, the eluent flow passing through the system may be driven by a limited vacuum generating device such as evacuated vials or vacuum chambers of limited volume, or similar means. Pumping may also be used as an alternative.

As described above, with each elution, the contaminants from the proceeding elution including breakthrough of unwanted species retarded by purification column located on the upstream end of the source chromatographic column will go back, at least to some extent, to the separation column. Also, in each elution the purification column located on the upstream end of the generator column will be regenerated, at least to some extent, by fresh feed primary eluent. Thus, the AFCC method is characterized by the capability of auto-regeneration of the purification columns by reversing the fresh feed primary eluent flow in the consecutive elution, hence resulting in longer life-time of the separation system. Advantageously, the AFCC method is characterized by using smaller separation and purification columns to ensure a more effective repeated separation resulting in high purity and higher concentration (or smaller eluate volume) of the separated product component.

The components of the alternating flow column chromatography apparatus may take different forms depending on specific design requirements. A variety of different forms are depicted in FIG. 12. In each case the apparatus shows the core elements of a separation (generator) column, two purification columns, an alternating flow valve, an eluent input port and an eluate output port. The variation from version to version resides in the shape of the separation column and the manner of loading.

FIG. 12$a$ shows a standard 'I' shaped separation column 121 with solution loading of the composition to be separated. Solution loading occurs through T connectors between the purification columns and the separation column. The composition to be separated may flow through the separation column from either direction.

FIG. 12$b$ shows an improved 'I' shaped separation column 122 with solution loading of the composition to be separated. Solution loading occurs through a central loading port 122$a$. The composition to be separated may flow through the separation column from the centre in either direction to T connectors between the purification columns and the separation column. The embodiment of FIG. 12$b$ could also be loaded in the same manner as the embodiment of FIG. 12$a$.

FIG. 12$c$ shows a standard 'I' shaped separation column 123 similar to the embodiment of FIG. 12$a$ but with an additional port 123$a$ that facilitates slurry loading or solution loading. The loading port 123$a$ is configured to permit loading of the slurry bypassing the T connector.

FIG. 12$d$ shows a 'U' shape separation column 124 for solution loading in the same manner as described by reference to FIG. 12$a$.

FIG. 12$e$ shows an improved 'U' shape separation column 125 with a central loading port 125$a$ for solution loading in the same manner as described by reference to FIG. 12$b$.

FIG. 12$f$ shows an improved 'U' shape separation column 126 with a central loading port 126$a$ and loading ports 126$b$ that facilitate slurry loading. The configuration of FIG. 12$f$ can be used for solution loading or slurry loading.

FIG. 12$g$ shows a segmental 'I' shaped separation-purification column 127 with the purification columns connected directly to the separation column. Loading ports 127$a$ facilitate slurry loading but may also be used for solution loading.

FIG. 12$h$ shows a segmental 'U' shape separation-purification column 128 which is identical to the embodiment of FIG. 12$f$ but with the purification columns connected directly to the separation column.

Implementation

Separation columns packed as sorbent and substrate columns used in the radionuclide generator designs are preferably divided into 2 groups based on the available specific radioactivity of the generating radionuclide sources loaded in the generator columns.

Group 1—AFCC-Based Radionuclide Generator Columns Loaded with Generating Radionuclide Sources of High Specific Activity The generating parent radionuclide source of high specific activity is specified as a no-carrier-added radionuclide source. As examples $^{68}$Ga-generator and $^{99m}$Tc-generator use the high specific activity $^{68}$Ge- and $^{99}$Mo-radionuclide sources produced by $^{69}$Ga (p, 2n) $^{68}$Ge reaction on particle accelerators and by nuclear fission reaction of $^{235}$U nuclide, respectively. The theoretical specific activity value of the no-carrier-added $^{99}$Mo radionuclide source is 17555.0 GBq (474.46 Ci) per mg Mo in carrier-free state of $^{99}$Mo nuclide. The high specific activity $^{99}$Mo source of specific activity >10.0 Ci $^{99}$Mo/mg Mo is currently available from different producers in the world today. This figure means that a small generator column packed with 100.0 milligram weight of sorbent of adsorption capacity 10-20 mg Mo per 1000 mg alumina sorbent and correspondingly small purification columns can be used. A generator column of 100 mg weight alumina and two purification columns of 500 mg weight are preferably used for an AFCC-based $^{99m}$Tc-generator production described in this invention.

This progress offers the use of an even smaller generator column packed with a newly developed sorbent of adsorption capacity 300 mg Mo per 1000 mg sorbent as specified in the patent applications WO 2011/106847 A1 and/or WO 2015/039170A1 and correspondingly small purification columns can be used for an improved chromatographic $^{99m}$Tc-generator production. Practically, a generator column of 10 mg weight sorbent and two purification columns of around 0.5 g weight is preferably used for an AFCC-based $^{99m}$Tc-generator production described in this invention. The performance of this AFCC-based generator using these high adsorption capacity sorbents is superior compared to a currently used DFCC-based generator which composes of the generator column loaded 2000.0 mg weight of the same alumina sorbent typically described in different $^{99m}$Tc-generator production facilities.

In the case of no-carrier-added $^{68}$Ge radionuclide source of high specific activity currently used in a column-chromatographic $^{68}$Ga-generator production, the theoretical specific activity is 247.5 MBq (6.689 mCi) perm Ge. Practically the $^{68}$Ge source of 58 MBq (1.6 mCi)$^{68}$Ge/µg Ge element is available for use in the $^{68}$Ga-generator production. A small generator column packed with 80.0 milligram weight of the sorbent of adsorption capacity 1.30 mg Ge per gram (or 1.30 µg/mg) sorbent as specified in the patent application WO 2011/106847 A1 and correspondingly small purification columns can be used for the production of $^{68}$Ga-generator of 150 mCi activity available for nuclear medicine use.

Practically, a generator column of 30-100 mg weight sorbent and of two purification columns of 500-1000 mg weight are preferably used for an AFCC-based $^{68}$Ga-generator production described in this invention. The performance of this AFCC-based generator is superior compared to a currently used DFCC-based generator which composes of the generator column loaded 1000.0-3000 mg weight of the same sorbent as shown in the prior of the art patent application WO 2011/106847 A1.

The alternating flow column chromatography (AFCC) method doesn't limit the size of columns used in the separation system. The size of the generator column and purification columns is a subject of optimization for the separation system design based on total required radioactivity and concentration of daughter (target) radionuclide and on the porosity, particle size, and the capacity and affinity of the packing material for the separating species. However for the production of a useful radionuclide generator used in nuclear medicine application, the following parameters are preferable for a radionuclide generator design.

It is generally stated that the AFCC-based radionuclide generator using a generating parent radionuclide source of high specific activity consists of:

Generator Column
  Column packing material weight: from 30 mg to 100 mg
    The weight of the column packing material is in the range from 30 mg to 100 mg. These columns are useful for the elution of the generator using evacuated vial. If the elution is performed using any type of liquid pump or a vial connected to a vacuum machine or to a vacuum chamber of large volume, then the weight of the column packing material and correspondingly the activity of the generators can be increased much more accordingly.
  Particle size: from 50 μm to 100 μm,
  Column size: ID (inner diameter): from 3 mm to 4 mm
  Length: from 5 mm to 10 mm Purification Columns
  The weight of the sorbent is in the range from 500 mg to 1000 mg.
    These are preferable for the elution of the generator using evacuated vial. If the elution is performed using any type of liquid pump or a vial connected to a vacuum machine or to a vacuum chamber of large volume, then the weight of the column packing material can be increased correspondingly with the increased size of the generator column.
  Particle size: From 30 μm to 75 μm
  Column size: ID (inner diameter): from 4 mm to 6 mm
  Length: from 10 mm to 20 mm Group 2—AFCC-Based Radionuclide Generator Columns Loaded with Generating Radionuclide Sources of Low Specific Activity Examples of generator columns applied in the AFCC method based $^{99m}$Tc-generators and $^{188}$Re-generators using low specific activity parent $^{188}$W- and $^{99}$Mo-radionuclide sources, respectively, are described in the present invention as follows.

Low specific activity $^{99}$Mo production based on reactor neutron capture is a viable and proven technology. The neutron capture-based $^{99}$Mo production evaluated at EOB of an 8-day irradiation process in a reactor of $2.0 \times 10^{13}$-$1.0 \times 10^{14}$ n·cm$^{-2}$·sec$^{-1}$ thermal neutron flux gives a $^{99}$Mo product of SA value around 0.3 to 1.6 mCi $^{99}$Mo per mg of natural isotopic abundance molybdenum and up to 6.0 mCi $^{99}$Mo per mg of 98%-enriched $^{98}$Mo target. While the specific activity of $^{99}$Mo produced using accelerators (ranging up to 10 mCi/mg at EOB) is not significantly higher than that of $^{99}$Mo produced by neutron capture using nuclear reactor. To produce the $^{99m}$Tc generators of the same activity size (1-5 Ci) as in the case of using high SA $^{99}$Mo mentioned above, new $^{99m}$Tc-generator system should be developed for of processing several grams of molybdenum existing in low specific activity $^{99}$Mo source.

Based on the adsorption capacity of the sorbents available today and on the specific radioactivity values of the generating parent radionuclide sources available from nuclear facilities around the world, the AFCC method advantageously uses the generator columns containing large amount of the sorbent for loading a sufficient activity of parent radionuclide solution or the generator columns containing a large amount of the substrate of sufficient parent radionuclide activity (such as the gel-type substrate synthesized from parent radionuclide solution and the pre-formulated powder substrate out-column-adsorbed with parent radionuclide solution) for the clinically useful $^{99m}$Tc-generator production.

The sorbent and substrate columns used in the designs of AFCC method based radionuclide generators useful for nuclear medicine application are preferably described herein comprising:

$^{99}$Mo-radionuclide sources of specific activity higher than 0.20-10.0 mCi $^{99}$Mo/mg, such as in the case of $^{99}$Mo radionuclide produced by thermal neutron capture reaction of stable $^{98}$Mo isotope target or by different nuclear reaction using particle accelerators and $^{100}$Mo isotope target;

Column packing sorbent of adsorption capacity higher than $2.0 \times 10^{-3}$ mole of Molybdenum element (equivalent to 191.9 mg Mo) per 1000 mg of column packing sorbent;

Column packing substrate of Mo-content (molal concentration) higher than $2.0 \times 10^{-3}$ mole of Molybdenum element per 1000 mg of column packing substrate.

These figures mean that a large generator column packed with >300.0 mg weight of the sorbent with adsorption capacity higher than $2.0 \times 10^{-3}$ mole of molybdenum element per 1000 mg of column packing sorbent are preferably used for an AFCC-based $^{99m}$Tc-generator production as described in this invention. The performance of this AFCC-based generator is much better in comparison to a currently used DFCC-based generator which consists of the generator column loaded with much larger weight of alumina sorbent typically described in different $^{99m}$Tc-generator production facilities.

Moreover, as a result of the development of high capacity sorbents the use of an even smaller generator column packed with a newly developed sorbent of the adsorption capacity of >300 mg Mo per 1000 mg sorbent as specified in the patent applications WO 2011/106847 A1 and/or WO 2015/039170A1 and correspondingly small purification columns can be advantageously used for the production of high performance $^{99m}$Tc-generators based on AFCC method.

For the production of a useful radionuclide generator used in nuclear medicine application, the following detailed parameters are preferable for radionuclide generator design. Practically, the generator columns of 0.3-50 g weight sorbent or substrate (Loading of 100-15000 mg Mo) and two purification columns of around 0.5-2.5 g weight are preferably used for production of AFCC-based $^{99m}$Tc-generator of radioactivity from 500 mCi to $150 \times 10^3$ mCi are preferably described, as examples, in this invention. The performance of these AFCC-based generators is superior compared to a currently used DFCC-based generator which composes of the generator column of much larger sorbent and/or substrate weight described by different radionuclide generator producers.

Although the maximal specific activity value of the no-carrier-added $^{188}$W radionuclide source is $3.72 \times 10^5$ MBq (10.06 Ci)/mg Tungsten. Practically $^{188}$W source of low specific activity 5-10 mCi $^{188}$W per mg W is currently available for $^{188}$Re-generator production using high neutron flux (>$10^{15}$ n·cm$^{-2}$·s$^{-1}$) reactor. Today the alumina based $^{188}$Re generators are based on the conventional DFCC method. This type of $^{188}$Re generator has a low $^{188}$W radioactivity (from 250 mCi to 1.0 Ci $^{188}$W for each generator unit). The $^{188}$W/$^{188}$Re generator production from lower specific radioactivity $^{188}$W solution producible in the medium neutron flux (>$2.10^{14}$ n·cm$^{-2}$·s$^{-1}$) reactors operated in many countries is promoted. For this purpose, the alternative $^{188}$Re generator production method and compact generator system should be anticipated to increase $^{188}$Re-concentration of the $^{88}$Re-eluate to meet the requirement of targeting radiopharmaceutical preparation. As a predictable example of up-scale of the AFCC method based $^{188}$Re-generator systems of >1.5 Ci $^{188}$W activity could be prepared using low specific radioactivity $^{188}$W (0.5 Ci/g W to 0.8 Ci/g W).

Based on the adsorption capacity of the sorbents available today and on the specific radioactivity values of the generating parent radionuclide sources available from nuclear facilities around the world, the AFCC method advantageously uses the generator columns containing large amount of the sorbent for loading a sufficient activity of parent radionuclide solution or the generator columns containing a large amount of the substrate of sufficient parent radionuclide activity (such as the gel-type substrate synthesized from parent radionuclide solution and the pre-formulated powder substrate out-column-adsorbed with parent radionuclide solution) for the clinically useful $^{188}$Re-generator production.

The sorbent and substrate columns used in the designs of AFCC method based radionuclide generators useful for nuclear medicine application are preferably described herein comprising:
  $^{188}$W-radionuclide sources of a specific activity 0.20-10.0 mCi $^{188}$W/mg such as in the case of $^{188}$W radionuclide produced by thermal neutron capture reaction of stable $^{186}$W isotope target,
  Column packing sorbent of a adsorption capacity higher than 2.0×10$^{-3}$ mole of Tungsten element (equivalent to 367.7 mg W) per 1000 mg of column packing sorbent,
  Column packing substrate of W-content (molal concentration) higher than 2.0×10$^{-3}$ mole of Tungsten element per 1000 mg of column packing substrate.

These figures mean that a large generator column packed with >300.0 mg weight of the sorbent with adsorption capacity higher than 2.0×10$^{-3}$ mole of tungsten element per 1000 mg of column packing sorbent are preferably used for an AFCC-based $^{188}$Re-generator production as described in this invention. The performance of this AFCC-based generator is much better compared to a currently used DFCC-based generator which composes of the generator column loaded with much larger weight of the alumina sorbent typically described in different $^{188}$Re-generator production facilities.

Moreover, as a result of the development of high capacity sorbents, the use of an even smaller generator column packed with a newly developed sorbent of adsorption capacity >500 mg W per 1000 mg sorbent as specified in the patent applications WO 2011/106847 A1 and/or WO 2015/039170A1 and correspondingly small purification columns can be advantageously used for the production of high performance $^{188}$Re-generators based on AFCC method.

For the production of a useful radionuclide generator used in nuclear medicine application, the following detailed parameters are preferable for radionuclide generator design. Practically, the generator columns of 0.3-50.0 g weight sorbent or substrate (Loading of 150.0-25000.0 mg W) and two purification columns of around 0.5-2.5 g weight are preferably used for production of AFCC-based $^{188}$Re-generators of radioactivity from 500 mCi to 250×10$^{3}$ mCi are preferably described, as examples, in this invention. The performance of these AFCC-based generators is superior compared to a currently used DFCC-based generator which composes of the generator column of much larger sorbent and/or substrate weight described by different radionuclide generator producers.

The alternating flow column chromatography (AFCC) method doesn't limit the size of columns used in the separation system. The size of the generator column and purification columns is a subject of optimization for the separation system design based on total required radioactivity and concentration of daughter (target) radionuclide and on the porosity, particle size, and the capacity and affinity of the packing material for the separating species. However for the production of a useful radionuclide generator used in nuclear medicine application, the following parameters are preferable for a radionuclide generator design.

Generally it is stated that the AFCC-based radionuclide generator using a generating parent radionuclide source of low specific activity composes of:
Generator Column
  Column packing material weight: from 0.3 g to 100 g
    The weight of the column packing material is in the range from 0.3 g to 50 g. This limit is preferable for the elution of the generator using evacuated vial. If the elution is performed using any type of liquid pump or a vial connected to a vacuum machine or to a vacuum chamber of large volume, then the weight of the column packing material can be increased to 100 g or much more.
  Particle size: from 50 μm to 200 μm, or mean particle size from 70 μm to 100 μm
  Column size: ID (inner diameter): from 5 mm to 25 mm
  Length: from 20 mm to 200 mm
Purification Columns
  The weight of the sorbent is in the range from 0.5 g to 2.0 g.
    This limit is preferable for the elution of the generator using evacuated vial. If the elution is performed using any type of liquid pump or a vial connected to a vacuum machine or to a vacuum chamber of large volume, then the weight of the column packing material can be increased correspondingly with the increased size of the generator column.
  Particle size: From 30 μm to 100 μm, or mean particle size from 50 μm to 70 μm
  Column size: ID (inner diameter): from 5 mm to 10 mm
  Length: from 10 mm to 50 mm Example 1: AFCC Method Based $^{68}$Ga-Generator Using High Specific Activity $^{68}$Ge-Source (Operation Per FIG. 13a)

This example of the present invention relates to the $^{68}$Ga generators produced based on the nano-crystalline sorbent ZT-11 (Adsorption capacity: 1.3 mg Ge/g sorbent) and the multifunctional sorbent ISOSORB-MOX-HP (Adsorption capacity: 3.0 mg Ge/g), which are specified in the patent applications WO 2011/106847 A1 and WO 2015/039170A1, respectively. $^{68}$Ge-source of high specific activity 1.6 mCi $^{68}$Ge/µg Ge was used for loading the generator column.

These sorbents are in solid particulate form, so that the generator columns contain a packed bed of the particulate sorbent. Both sorbents have a much higher affinity for $^{68}$Ge than for $^{68}$Ga so that $^{68}$Ga is preferentially eluted from the sorbent while the majority, preferably substantially all, of the $^{68}$Ge is retained on the sorbent. Typically both sorbents ZT-11 and ISOSORB-MOX-HP are such that the breakthrough percentage of $^{68}$Ge is less than $10^{-5}$% or $10^{-6}$%. The sorbents are resistant to radiation. This feature is important since the $^{68}$Ge typically resides on the generator column for a period longer than 2 years. The Ge adsorption capacity of the sorbents ZT-11 and ISOSORB-MOX-HP is sufficiently high (as shown in Table 1), so as a high $^{68}$Ga radioactivity generator may be prepared based on these sorbents. Typically a generator column of several hundreds mCi $^{68}$Ga may be prepared from. The sorbents are chemically stable in HCl solution eluents having a wide range of concentrations. Typically these sorbents are stable in HCl solution of up to 3 M HCl. Typical generator column contains from 0.03 g to 1.0 g sorbent as shown in Table 1.

As shown in Table 1, First $^{68}$Ga-generator is an AFCC-based $^{68}$Ga-generator and second one is a comparative conventional DFCC-based $^{68}$Ga-generator. These generators being of the same parent nuclide activity and using the same sorbent ZT-11 (as shown in Table 1) were manufactured and their performance was tested for justification on the superior advantage of AFCC-based $^{68}$Ga-generator compared to conventional DFCC-based $^{68}$Ga-generator. Third $^{68}$Ga-generator, using a multifunctional sorbent ISOSORB-MOX-HP of higher $^{68}$Ge-adsorption capacity (3.0 mg Ge/g) which was specified in the patent application WO 2015/039170A1 and being loaded with of much higher parent activity, was manufactured and its performance was tested for justification on the superior advantage of AFCC-based $^{68}$Ga-generator in the production of the eluate solution of super high concentration of target (daughter) radionuclide $^{68}$Ga.

A suitable generator design for separating target radionuclide $^{68}$Ga from mixtures of generating parent nuclide $^{68}$Ge ions and $^{68}$Ga ions, is described above. The generator column is made from glass or stainless steel or thermoplastic material (such as polyetheretherketone (PEEK), polypropylene, polyethylene, cellulose acetate etc.) and is provided with fritted sintered quartz or fritted stainless steel or fritted polypropylene filter disks at both ends. The ends are closed by septa together with silicone rubber gaskets. The generator column ends are capped by aluminium clamping lids. The generator column is from 5 mm to 10 mm in length and from 3 mm to 4 mm inner diameter. The fritted filter disks are of 20 µm porosity. The generator column is packed with a sorbent which is detailed in Table 1 and both its ends are connected to two purification columns loaded with the same sorbent of weight detailed in Table 1. Purification columns are made from glass or stainless steel or plastic material (such as polyetheretherketone (PEEK), polypropylene, polyethylene, cellulose acetate etc.) and are provided with fritted sintered quartz or fritted stainless steel or fritted polypropylene filter disks at both ends. The ends are closed by septa together with silicone rubber gaskets. The purification column ends are capped by aluminium clamping lids. The purification column is from 10 mm to 20 mm in length and from 4 mm to 6 mm in inner diameter. The fritted filter disks are of 20 µm porosity. The generator column and purification columns are connected to the alternating flow acting valve and assembled into a cartridge chassis of generator cartridge. Feed eluent port, Eluate collection port and Loading port for the generating $^{68}$Ge-radionuclide solution are assembled as described previously. The assembled cartridge is housed in a radiation protection shielding lead container.

In operation of the generator, 0.1 M HCl solution is used as an eluent of $^{68}$Ga. Thus eluent supply is a sterile vial loaded with this eluent solution. This eluent vial is applied to vented spike of the feed eluent port. The sorbent in the generator column is loaded with $^{68}$Ge. On the sorbent, this gradually decays to form $^{68}$Ga.

In one of the elution of the generator when a solution of $^{68}$Ga is required, first channel of the dual channel alternating flow acting valve is opened (the second channel is automatically closed) and an evacuated vial is applied to the needle of the eluate collection port. This causes eluent to flow from eluent supply vial through the pathway of the First purification column→Generator column→Second purification column connection, so as to elute $^{68}$Ga into evacuated vial used as $^{68}$Ga product container. Because the affinity of the sorbent in generator column and purification columns for $^{68}$Ge is high, negligible or zero amounts of $^{68}$Ge are eluted from the sorbent. However, as the affinity of the sorbent in all columns for $^{68}$Ga is quite low, this species is readily eluted, resulting in an eluent collected in evacuated vial used as $^{68}$Ga product container which comprises a solution of $^{68}$Ga substantially free of $^{68}$Ge.

In the elution following the preceding elution of the generator when a solution of $^{68}$Ga is required, second channel of the dual channel alternating flow acting valve is opened (the first channel is automatically closed) and an evacuated vial is applied to the needle of the eluate collection port. This causes eluent to flow from eluent supply vial through the reverse pathway of the Second purification column→Generator column→First purification column connection, so as to elute $^{68}$Ga into evacuated vial used as $^{68}$Ga product container. By this way the small amount of $^{68}$Ge broken through from generator column and trapped on second purification column will be washed back to the generator column and this second purification column is cleaned up and regenerated.

Loading of Stock Acidic $^{68}$Ge Solution on Generator Column

Before loading with $^{68}$Ge solution, the sorbent column was washed with about 5 mL 1M HCl solution. The stock acidic $^{68}$Ge solution was a 0.1 M HCl $^{68}$Ge solution. $^{68}$Ge concentration was about 1-12 mCi/mL, e.g. about 10.0 mCi $^{68}$Ge/mL. The $^{68}$Ge solution volume applied to each generator column was about 5-15 mL. The stock acidic $^{68}$Ge solution was loaded onto a generator column through loading port using an evacuated vial for sucking the $^{68}$Ge solution through the generator column with a flow rate of 0.15 mL/minute. Following the loading, the column was washed with 10 mL 0.1 M HCl solution. The column was then ready for regular eluting (separating)$^{68}$Ga daughter radioisotope solutions for daily use.

Eluting $^{68}$Ga

The generator was eluted with 2 mL or 6 mL or 3 mL 0.1 M HCl solution and the elution profile of the $^{68}$Ga was recorded. The graphic radioactivity recording system (which is not a part of the $^{68}$Ga generator system described in this invention) indicated the effective elution volume used for the elution of $^{68}$Ga. Table 1 shows the performance of the AFCC-based $^{68}$Ga generator of this invention compared with a conventional DFCC-based $^{68}$Ga generator. The present invention provides improved elution volume (smaller volume of $^{68}$Ga eluate) giving higher $^{68}$Ga-concentration and longer useful life without any additional action during operation.

Example 2: AFCC Method Based $^{99m}$Tc-Generator Using Low Specific Activity $^{99}$Mo-source (Operation per FIG. 13a)

This example of the present invention relates to the $^{99m}$Tc generators produced based on the PZC sorbent (Adsorption capacity: 250 mg W per gram Sorbent) and Multifunctional sorbent ISOSORB-MOX-HP (Adsorption capacity: 300 mg Mo/g; Patent Application Publication WO 2015/039170A1). $^{99}$Mo source of low specific activity 1.0 mCi $^{99}$Mo/mg Mo was used for loading the generator column.

These sorbents are in solid particulate form, so that the generator columns contain a packed bed of the particulate sorbent. Both sorbents have a much higher affinity for $^{99}$Mo than for $^{99m}$Tc so that $^{99m}$Tc is preferentially eluted from the sorbent while the majority, preferably substantially all, of the $^{99}$Mo is retained on the sorbent. Typically both sorbents PZC sorbent and Multifunctional sorbent ISOSORB-MOX-HP are such that the breakthrough percentage of $^{99}$Mo is less than $10^{-3}$% or $10^{-4}$%. The sorbents are resistant to radiation. This feature is important since the $^{99}$Mo typically resides on the generator column for a period longer than two months. The Mo adsorption capacity of these sorbents is sufficiently high (as shown in Table 2), so as a high $^{99m}$Tc radioactivity generator may be prepared based on these sorbents. Typically a generator column of several Ci $^{99m}$Tc may be prepared from a generator column containing from 0.3 g to 100.0 g sorbent as shown in Table 2.

As shown in Table 2, First $^{99m}$Tc-generator is an AFCC-based $^{99m}$Tc-generator and second one is a comparative conventional DFCC-based $^{99m}$Tc-generator. These generators being of the same parent nuclide activity using the same PZC sorbent were manufactured and their performance was tested for justification on the superior advantage of AFCC-based $^{99m}$Tc-generator compared to conventional DFCC-based $^{99m}$Tc-generator. Third $^{99m}$Tc-generator, using a multifunctional sorbent ISOSORB-MOX-HP of higher $^{99}$Mo-adsorption capacity (300.0 mg Mo/g) which was specified in the patent application WO 2015/039170A1 and being loaded with much higher parent nuclide activity, was manufactured and its performance was tested for justification on the superior advantage of AFCC-based $^{99m}$Tc-generator in the production of the eluate solution of super high concentration of target (daughter) radionuclide $^{99m}$Tc.

A suitable generator design for separating target radionuclide $^{99m}$Tc from mixtures of generating parent nuclide $^{99}$Mo ions and $^{99m}$Tc ions, is described previously. The generator column is made from glass or stainless steel or thermoplastic material (such as polyetheretherketone (PEEK), polypropylene, polyethylene, cellulose acetate etc.) and is provided with fritted sintered quartz or fritted stainless steel or fritted polypropylene filter disks at both its ends. The ends are closed by septa together with silicon rubber gaskets. The generator column ends are capped by aluminium clamping. The generator column is from 20 mm to 200 mm in length and from 5 mm to 25 mm inner diameter. The fitted filter disks are of 50 μm porosity. The generator column is packed with a sorbent which is detailed in Table 2 herein and both its ends are connected to two purification columns loaded with the same sorbent of weight detailed in Table 2. The purification column is made from glass or stainless steel or plastic material (such as polyetheretherketone (PEEK), polypropylene, polyethylene, cellulose acetate etc.) and is provided with fritted sintered quartz or fritted stainless steel or fritted polypropylene filter disks at both the ends. The ends are closed by septa together with silicon rubber gaskets. The purification column ends are capped by aluminium clamping lids. The purification column is from 10 mm to 50 mm in length and from 5 mm to 10 mm in inner diameter. The fritted filter disks are of 20 μm porosity.

The generator column and purification columns are connected to the alternating flow acting valve and assembled into a cartridge chassis of generator cartridge. Feed eluent port, eluate collection port and loading port for the generating $^{99}$Mo-radionuclide solution are assembled as shown previously. The assembled cartridge is housed in a radiation protection shielding lead container.

The details of the columns and sorbents in use are shown in Table 2.

In operation of the generator, 0.9% NaCl solution is used as an eluent of $^{99m}$Tc. Thus eluent supply is a sterile vial loaded with this eluent solution. This eluent vial is applied to vented spike of the feed eluent port. The sorbent in generator column is loaded with $^{99}$Mo. On the sorbent, this gradually decays to form $^{99m}$Tc.

In one of the elution of the generator when a solution of $^{99m}$Tc is required, first channel of the dual channel alternating flow acting valve is opened (the second channel is automatically closed) and an evacuated vial is applied to the needle of the eluate collection port. This causes eluent to flow from eluent supply vial through the pathway of the First purification column→Generator column→Second purification column connection, so as to elute $^{99m}$Tc into evacuated vial used as $^{99m}$Tc product container. Because the affinity of the sorbent in generator column and purification columns for $^{99}$Mo is high, negligible or zero amounts of $^{99}$Mo are eluted from the sorbent. However, as the affinity of the sorbent in all columns for $^{99m}$Tc is quite low, this species is readily eluted, resulting in an eluent collected in evacuated vial used as $^{99m}$Tc product container which comprises a solution of $^{99m}$Tc substantially free of $^{99}$Mo.

In the elution following the preceding elution of the generator when a solution of $^{99m}$Tc is required, second channel of the dual channel alternating flow acting valve (201(AFV) is opened (its first channel is automatically closed) and an evacuated vial is applied to the needle of the eluate collection port. This causes eluent to flow from eluent supply vial through the reverse pathway of the Second purification column→Generator column→First purification column connection, so as to elute $^{99m}$Tc into evacuated vial used as $^{99m}$Tc product container. By this way the small amount of $^{99}$Mo broken through from generator column and trapped on second purification column will be washed back to the generator column and this second purification column is cleaned up and regenerated.

Loading of Stock $^{99}$Mo Solution on Generator Column

Before loading with $^{99}$Mo solution, the sorbent column was washed with about 30 mL 0.1M $HNO_3$ solution. The stock $^{99}$Mo solution was a $^{99}$Mo solution of pH=3. Mo element concentration was about 10-15 mg Mo/mL. $^{99}$Mo concentration was about 10-20 mCi/mL, e.g. about 12.5 mCi $^{99}$Mo/mL. The $^{99}$Mo solution volume applied to each generator column was about 200-500 mL. The stock $^{99}$Mo solution was loaded onto a generator column through loading port using an evacuated vial for sucking the $^{99}$Mo solution through the generator column with a flow rate of 1.5 mL/minute. Following the loading, the column was washed with 100 mL 0.1 M $HNO_3$ solution followed by a 50 ml 0.9% NaCl solution wash. The column was then ready for regular eluting (separating)$^{99m}$Tc daughter radioisotope solutions for daily use.

Eluting $^{99m}$Tc

The generator was eluted with 22 mL or 65 mL or 40 mL 0.9% NaCl solution and the elution profile of the $^{99m}$Tc was recorded. The graphic radioactivity recording system (which is not a part of the $^{99m}$Tc generator system described in this invention) indicated the effective elution volume used for the elution of $^{99m}$Tc. Table 2 shows the performance of the AFCC-based $^{99m}$Tc generator of this invention compared with a conventional DFCC-based $^{99m}$Tc generator. The present invention provides improved elution volume (smaller volume of $^{99m}$Tc eluate) giving higher $^{99m}$Tc-concentration and longer useful life without any additional action during operation.

Example 3: AFCC Method Based $^{188}$Re-Generator Using Low Specific Activity $^{188}$W-Source (Operation Per FIG. 13a)

This example of the present invention relates to the $^{188}$Re generators produced based on the Alumina (Adsorption capacity: 100-120 mg W per gram Sorbent) and Multifunctional sorbent ISOSORB-MOX-HP (Adsorption capacity: 500 mg W/g Patent Application Publication WO 2015/039170A1). $^{188}$W-source of low specific activity 5.0 mCi $^{188}$W/mg W was used for loading the generator column.

These sorbents are in solid particulate form, so that the generator columns contain a packed bed of the particulate sorbent. Both sorbents have a much higher affinity for $^{188}$W than for $^{188}$Re so that $^{188}$Re is preferentially eluted from the sorbent while the majority, preferably substantially all, of the $^{188}$W is retained on the sorbent. Typically both sorbents Alumina and Multifunctional sorbent ISOSORB-MOX-HP are such that the breakthrough percentage of $^{188}$W is less than $10^{-4}$% or $10^{-5}$%. The sorbents are resistant to radiation. This feature is important since the $^{188}$W typically resides on the generator column for a period longer than 500 days. The W adsorption capacity of these sorbents is sufficiently high (as shown in Table 3), so as a high $^{188}$Re radioactivity generator may be prepared based on these sorbents. Typically a generator column of several Ci $^{188}$Re may be prepared from a generator column containing from 0.3 g to 100.0 g sorbent as shown in Table 3.

As shown in Table 3, First $^{188}$Re-generator is an AFCC-based $^{188}$Re-generator and second one is a comparative conventional DFCC-based $^{188}$Re-generator. These generators being of the same parent nuclide activity using the same Alumina sorbent were manufactured and their performance was tested for justification on the superior advantage of AFCC-based $^{188}$Re-generator compared to conventional DFCC-based $^{188}$Re-generator. Third $^{188}$Re-generator, using a multifunctional sorbent ISOSORB-MOX-HP of higher $^{188}$W-adsorption capacity (500.0 mg W/g) which was specified in the patent application WO 2015/039170A1 and being loaded with much higher parent nuclide activity, was manufactured and its performance was tested for justification on the superior advantage of AFCC-based $^{188}$Re-generator in the production of the eluate solution of super high concentration of target (daughter) radionuclide $^{188}$Re.

A suitable generator design for separating target radionuclide $^{188}$Re from mixtures of generating parent nuclide $^{188}$W ions and $^{188}$Re ions, is described previously. The generator column, shown in FIGS. 3 and 5, is made from glass or stainless steel or thermoplastic material (such as polyetheretherketone (PEEK), polypropylene, polyethylene, cellulose acetate etc.) and is provided with fritted sintered quartz or fritted stainless steel or fritted polypropylene filter disks at both its ends. The ends are closed by septa together with silicon rubber gaskets. The generator column ends are capped by aluminium clamping lids. The generator column is from 20 mm to 200 mm in length and from 5 mm to 25 mm inner diameter. The fritted filter disks are of 50 μm porosity. The generator column is packed with a sorbent which is detailed in Table 3 herein and both its ends are connected to 2 purification columns loaded with the same sorbent of weight detailed in Table 3. The purification column is made from glass or stainless steel or plastic material (such as polyetheretherketone (PEEK), polypropylene, polyethylene, cellulose acetate etc.) and is provided with fritted sintered quartz or fritted stainless steel or fritted polypropylene filter disks at both its ends. The ends are closed by septa together with silicon rubber gaskets. The purification column ends are capped by aluminium clamping lids. The purification column is from 10 mm to 50 mm in length and from 5 mm to 10 mm in inner diameter. The fritted filter disks are of 20 μm porosity.

The generator column and purification columns are connected to the alternating flow acting valve and assembled into a cartridge chassis of generator cartridge. The feed eluent port, eluate collection port and loading port for the generating $^{188}$W-radionuclide solution are assembled as previously described. The assembled cartridge is housed in a radiation protection shielding lead container.

The details of the columns and sorbents in use are shown in Table 3.

In operation of the generator, 0.9% NaCl solution is used as an eluent of $^{188}$Re. Thus eluent supply is a sterile vial loaded with this eluent solution. This eluent vial is applied to vented spike of the feed eluent port. The sorbent in generator column is loaded with $^{188}$W. On the sorbent, this gradually decays to form $^{188}$Re.

In one of the elution of the generator when a solution of $^{188}$Re is required, first channel of the dual channel alternating flow acting valve is opened (its second channel is automatically closed) and an evacuated vial is applied to the needle of the eluate collection port. This causes eluent to flow from eluent supply vial through the pathway of the First purification column→Generator column→Second purification column connection, so as to elute $^{188}$Re into evacuated vial used as $^{188}$Re product container. Because the affinity of the sorbent in generator column and purification columns for $^{188}$W is high, negligible or zero amounts of $^{188}$W are eluted from the sorbent. However, as the affinity of the sorbent in all columns for $^{188}$Re is quite low, this species is readily eluted, resulting in an eluent collected in evacuated vial used as $^{188}$Re product container which comprises a solution of $^{188}$Re substantially free of $^{188}$W.

In the elution following the preceding elution of the generator when a solution of $^{188}$Re is required, second channel of the dual channel alternating flow acting valve is opened (the first channel is automatically closed) and an evacuated vial is applied to the needle of the eluate collection port. This causes eluent to flow from eluent supply vial through the reverse pathway of the Second purification column→Generator colum→First purification column connection, so as to elute $^{188}$Re into evacuated vial used as $^{188}$Re product container. By this way the small amount of $^{188}$W broken through from generator column and trapped on second purification column 40(PC) will be washed back to the generator column and this second purification column 40(PC) is cleaned up and regenerated.

Loading of Stock $^{188}$W Solution on Generator Column

Before loading with $^{188}$W solution, the sorbent column was washed with about 30 mL 0.1M $HNO_3$ solution. The stock $^{188}$W solution was a $^{188}$W solution of pH=3. W element concentration was about 20-30 mg W/mL. $^{99}$Mo concentration was about 100-150 mCi/mL, e.g. about 125 mCi $^{188}$W/mL. The $^{188}$W solution volume applied to each generator column was about 5-10 mL. The stock $^{188}$W solution was loaded onto a generator column through loading port using an evacuated vial for sucking the $^{188}$W solution through the generator column with a flow rate of 1.0 mL/minute. Following the loading, the column was washed with 50 mL 0.1 M HNO$_3$ solution followed by a 50 ml 0.9% NaCl solution wash. The column was then ready for regular eluting (separating)$^{188}$Re daughter radioisotope solutions for daily use.

Eluting $^{188}$Re

The generator was eluted with 10 mL 0.9% NaCl solution and the elution profile of the $^{188}$Re was recorded. The graphic radioactivity recording system (which is not a part of the $^{188}$Re generator system described in this invention) indicated the effective elution volume used for the elution of $^{188}$Re. Table 3 shows the performance of the AFCC-based $^{188}$Re generator of this invention compared with a conventional DFCC-based $^{188}$Re generator. The present invention provides improved elution volume (smaller volume of $^{188}$Re eluate) giving higher $^{188}$Re-concentration and longer useful life without any additional action during operation.

Example 4: AFCC Method Based $^{99m}$Tc-Generator with Selective Elution Operation (Operation Per FIG. 13b)

This example of the present invention relates to the $^{99m}$Tc-generators produced based on AFCC apparatus designed with incorporation of the specific eluent port and eluent-selective valve as shown in FIG. 5. The inclusion of these component parts offers a capability of eluent variation for an alternating flow chromatography (AFCC) apparatus resulting an advantageous feature of the invention: the separation of daughter radionuclide (product) component with higher purity in higher concentration. This feature is resulted from more operation functions of eluent variation performed with the port and valve. In this example, an additional selective elution function of eluting the purified daughter radionuclide (product) component with purposely used specific eluent from purification column.

All experimental conditions shown in Table 4 and the loading of stock $^{99}$Mo solution on generator column are similar to Example 2, except the processes of selective elution of the daughter radionuclide $^{99m}$Tc eluate using a specific eluent from purification column.

Eluting a Raw $^{99m}$Tc Daughter Radionuclide from the Generator Column with a Primary Eluent and Selectively Eluting the Specific Eluate of $^{99m}$Tc Daughter Radionuclide from Purification Column The generator was eluted with 35.0-40.0 mL primary eluent. The primary eluent is 0.05-0.10% NaCl solution. At this elution step the purification column retains all $^{99m}$Tc content and a small amount of some contaminants including small breakthrough of $^{99}$Mo parent nuclide. In a further step, a specific eluent (SE), 3.0 mL 0.9% NaCl solution (a specific eluent purposely used for eluting the eluate of $^{99m}$Tc product) is put into use in replacing the primary eluent by actuating the eluent-selective valve (TV) to put it into a suitable position. By this operation way the specific eluent passes through the purification column for eluting the specific eluate (SEL) of $^{99m}$Tc daughter radionuclide from the purification column into a specific eluate (SEL) receptacle means for use.

Table 4 shows the performance of the AFCC-based $^{99m}$Tc generator produced based on AFCC apparatus designed with incorporation of the specific eluent port and eluent selective valve in comparison with AFCC apparatus designed without the specific eluent port and eluent specific valve. It is clear from the results obtained that the inclusion of the specific eluent port and eluent specific valve offers a capability of eluent variation for an alternating flow chromatography (AFCC) apparatus resulting an advantageous feature of our invention: the separation of $^{99m}$Tc daughter radionuclide in higher concentration.

Example 5: AFCC Method Based $^{68}$Ga-Generator with Further Purification Operation (Operation Per FIG. 13c)

This example of the present invention relates to the $^{68}$Ga generators produced based on AFCC apparatus designed with incorporation of the specific eluent port and eluent selective valve as shown in FIG. 5. The inclusion of these component parts offers a capability of eluent variation for an alternating flow chromatography (AFCC) apparatus resulting in an advantageous feature of our invention: the separation of daughter radionuclide (product) component with higher purity in higher concentration. This feature is resulted from more operation functions of eluent variation performed with the specific eluent port and eluent specific valve. In this example, an additional operational function of further purification of the daughter radionuclide (product) component with additional specific eluents and then selectively eluting the eluate of purified daughter radionuclide with purposely used specific eluent from purification column.

All experimental conditions shown in Table 5 and the loading of stock acidic $^{68}$Ge solution on generator column are similar to Example 1, except the processes of further purification of $^{68}$Ga and selectively eluting the $^{68}$Ga eluate.

Eluting a Raw $^{68}$Ga Daughter Radionuclide from the Generator Column with a Primary Eluent and Further Purification of $^{68}$Ga Followed by Selectively Eluting the Specific Eluate of $^{68}$Ga Daughter Radionuclide from Purification Column The generator was eluted with 2.5-3.0 mL primary eluent. The primary eluent is 0.1 M HCl solution. At this elution step the purification column retains all $^{68}$Ga content and a small amount of some contaminants including small breakthrough of $^{68}$Ge parent nuclide. In the step of further purification, a specific eluent (SE), 5.0 ml 4 M HCl+1% Ascorbic acid solution, is put into use in replacing primary eluent by actuating the eluent selective valve to put the valve into a suitable position. By this operation way the specific eluent passes through the purification column only to remove the contaminants from the purification column into the waste container attached to the eluate output port while keeping the $^{68}$Ga daughter nuclide further retained on the purification column. In the following step a purposely used specific eluent (1.0 mL 0.05 M HCl solution) is used for selectively eluting the specific eluate (SEL) of $^{68}$Ga daughter nuclide (product) component from the purification column into a specific eluate (SEL) receptacle means for use.

Table 5 shows the performance of the AFCC-based $^{68}$Ga generator produced based on AFCC apparatus designed with incorporation of the port and valve in comparison with AFCC apparatus designed without the port and valve. It is clear from the results obtained that the inclusion of the port and valve offers a capability of eluent variation for an alternating flow chromatography (AFCC) apparatus resulting an advantageous feature of our invention: the separation of $^{68}$Ga daughter radionuclide with higher purity in higher concentration.

Separation Performance of AFCC Apparatus

To show the superior separation features of the AFCC apparatus, the separation performance of the apparatus is evaluated based on the improvement in the desired component concentration of the eluate (such as the concentration of daughter radionuclide), in the increase of loaded quantity of the composition to be separated, and in the purity of separated desired component in repeated separation processes. All these performance parameters can be experimentally measured as listed in different examples of this invention. However, the eluate concentration improvement and the loaded quantity of separation composition (in other word the separation capacity) can also be theoretically assessed.

Figure 14:
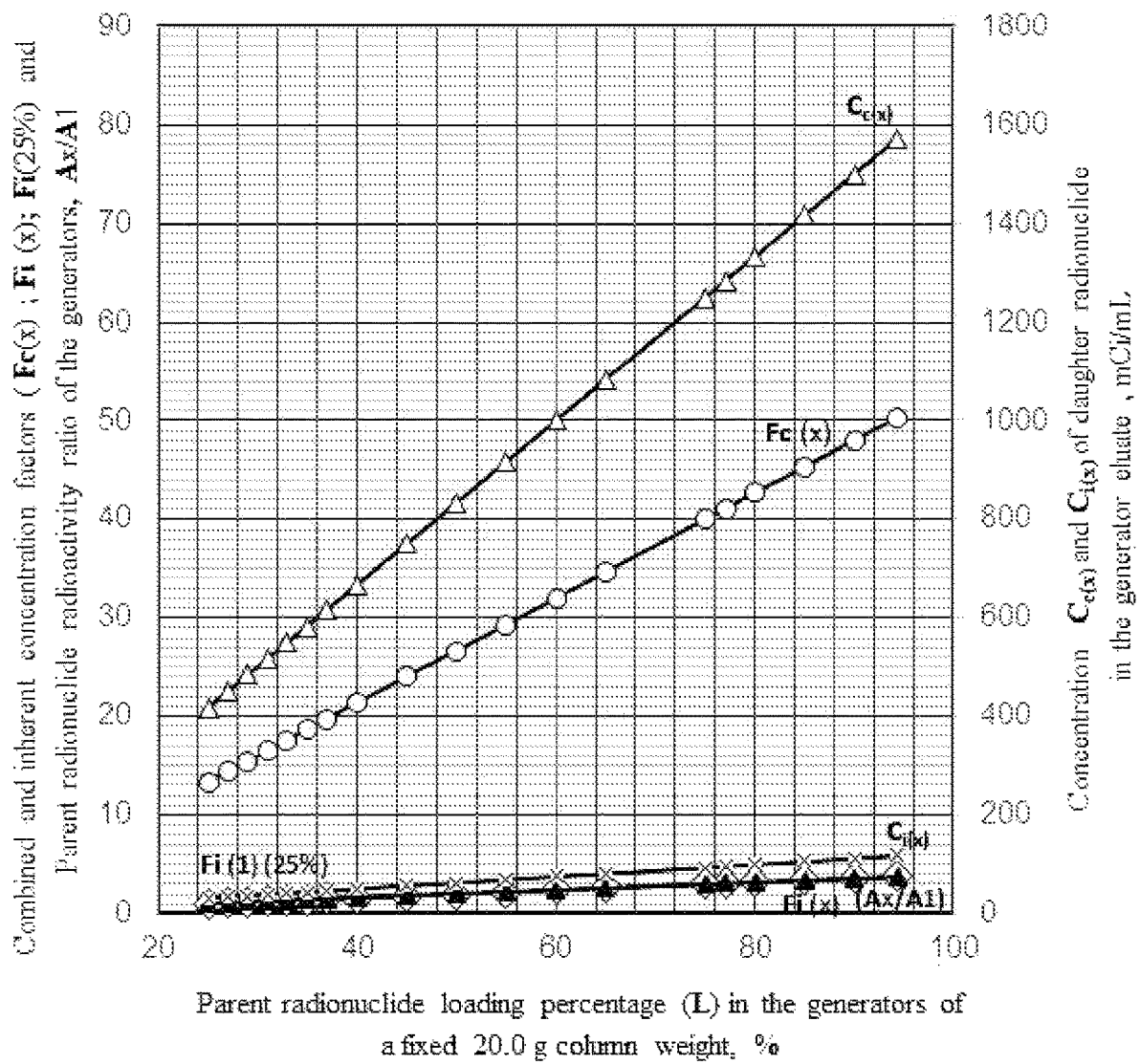
FIG. 14 shows a graph demonstrating the effectiveness of the AFCC apparatus.

FIG. 14 shows a superior separation performance parameters achieved in the process of Example 4. Parent $^{99}$Mo-radionuclide activity (separation capacity), concentration factors (Fi and Fc) and daughter $^{99m}$Tc-radionuclide concentration of $^{99m}$Tc-eluate are significantly increased due to a separation column fully loaded with separation composition (parent $^{99}$Mo-radionuclide) of the AFCC apparatus.

It is given that

Index (x) is for a target process; Index (n) is for a comparative process; $(A_n/m_n)=(A_x/m_x)$ is column-bed-specific radioactivity; $(V_n/M_n)=(V_x/M_x)$ is column-bed-specific elution volume; $m_x$ and $m_n$ are the weight of fully composition-loaded beds of the separation column; $L_n=100*(m_n/M_n)$ and $L_x=100*(m_x/M_x)$ are the composition-loading percentages; $p_x$ and $p_n$ are the composition-unloaded column percentages $$C_n = \frac{A_n}{V_n} \quad \text{Eq 1}$$

$$C_x = \frac{A_x}{V_x} = \frac{\left\{\frac{A_n}{\left(M_n - \frac{p_n \cdot M_n}{100}\right)} * \left(M_x - \frac{p_x \cdot M_x}{100}\right)\right\}}{(V_n/M_n)*M_x} = \frac{A_n}{V_n} * \frac{M_n}{M_x} * \frac{m_x}{m_n} \rightarrow$$

$$C_x = \frac{A_n}{V_n} * \frac{M_n}{M_x} * \left\{\frac{(100M_x - p_x \cdot M_x)}{(100M_n - p_n \cdot M_n)}\right\} \quad \text{Eq 2}$$

Inherent Concentration Factor Fi(x) Achieved with Operating with Function 1:

$$Fi(x) = \frac{C_x}{C_n} = \frac{M_n}{M_x} * \frac{100*M_x - p_x*M_x}{100*M_n - p_n*M_n} \quad \text{Eq 3}$$

Combined Concentration Factor Fc(x) Achieved with Operating with Function 2 or Function 3:

$$Fc(x) = \frac{C_{x(c)}}{C_n} \rightarrow Fc(x) = \frac{C_x}{C_n} = \frac{Fc(n)}{V_n*Fi(n)} * V_x * Fi(x) \quad \text{Eq 4}$$

Equations Used for FIG. 14:

Starting from a basic equation Eq 3 below, the calculation of the concentration of desired component, concentration factors (Fi and Fc), and the relationship between Inherent Concentration Factor (Fi) and Combined Concentration Factor (Fc) is based on the data of chromatographic columns, specific radioactivity of parent radionuclide, and specific elution volume of the eluents used in the processes of the example 4.

Index (x) is for a target process/generator, Index (n) is for a comparative process/generator and in the case the comparative process/generator is the one giving the smallest desired component concentration, then n=1.

1) Inherent concentration factor:
With $p_x*M_x \neq p_1*M_1$ for all SC columns of the same M value, it means $M_x=M_1$ $$Fi(x) = \frac{M_x}{M_1} * \frac{100*M_x - p_x*M_x}{100*M_1 - p_1*M_1} = \frac{100-p_x}{100-p_1} \quad \text{Eq 5}$$

2) Ratio of radioactivity of the columns:

Due to $$L_x(\%) = (100 - p_x),$$

$$\frac{A_x}{A_1} = Fi(x) \rightarrow \frac{A_x}{A_1} = \frac{V*C_x}{V*C_1} = \frac{100-p_x}{100-p_1} \quad \text{Eq 6}$$

3) Combined Concentration Factor Fc(x) achieved with operating with Function 2 or Function 3

$$Fc(x) = \frac{C_{x(c)}}{C_1} \rightarrow Fc(x) = \frac{C_x}{C_1} = \frac{Fc(1)}{V_1*Fi(1)} * V_x * Fi(x) \quad \text{Eq 7}$$

4) Concentration of the eluate of the different columns operated with Function 1 of the apparatus:

$$C_x(i)=F_i(x)*C_1 \quad \text{Eq 8}$$

5) Concentration of the eluate of the different columns operated with Function 2 or Function 3 of the apparatus:

$$C_x(c)=F_c(x)*C_1 \quad \text{Eq 9}$$

In the case the use of the radionuclide generator columns (separation columns) of different column packing materials (sorbents) with a variable adsorption capacity of parent radionuclide (C) for loading of parent radionuclide with a variable specific radioactivity (SA) is required using a pre-fixed design of apparatus as specified in the example 4, the radioactivity (Ax) of intended new generator and the radioactivity ($A_1$) of comparative generator are evaluated based on the following conversion relationships:

$$A_1 = M_x * \left(\frac{100-p_1}{100}\right) * C * SA \text{ or } SA = \frac{A_1}{M_x*C} * \frac{100}{100-p_1}$$

$$A_x = Fi(x) * A_1 \text{ or } A_1 = \frac{A_x}{Fi(x)}$$

For calculation of $A_1$ and $A_x$ the parameters of a fixed design of AFCC apparatus (radionuclide generator) $M_x$, Fi(x), $p_1$ and $p_x$ (Fi(x) is calculated using Eq. 5) and the C and SA values are needed.

In relation to the Example 4, the AFCC apparatus design is fixed at the following parameters listed in Table 4 (Generator D) with the specification of the sorbent used as a column packing material of separation column: C=250 mg Mo/g sorbent and the property of the composition to be separated (Parent radionuclide): SA=1.0 mCi $^{99}$Mo/mg Mo.

$A_1 = 20*[(100-75)/100]*250*1.0 = 1250$ mCi $^{99}$Mo;

$A_x = 3.775*1250 = 4178.7$ mCi $^{99}$Mo

If a generator of 1268.91 mCi $^{99}$Mo activity is intended to produce from a sorbent of adsorption capacity C=200 mg Mo/g sorbent using a fixed design of AFCC apparatus (radionuclide generator D) described in Table 4, then a parent $^{99}$Mo-radionuclide of specific radioactivity should be used:

$$A_1 = \frac{A_x}{Fi(x)} = \frac{1268.91}{3.775} = 336.1 \, mCi^{99}\,Mo$$

$$SA = \frac{A_1}{M_x * C} * \frac{100}{100 - p_1} = \frac{336.1}{20 * 200} * \frac{100}{100 - 75} = 0.3361 \, mCi/\text{mg Mo}$$

Superior features of AFCC-apparatus are shown in the following table:

| DFCC-based $^{99m}$Tc-GENERATOR (Generator A and B in Table 4) | AFCC-based $^{99m}$Tc-GENERATOR (Generator C and D in Table 4) |
| --- | --- |
| Generator specification: Weight of sorbent in the generator columns: M = 20.0 g (including 1.125 g of the sorbent in the purification column) Parent $^{99}$Mo-radionuclide Loading m(L) = 5.0 g, L = 25.0% of M (26.49% loading of SC column) Parent $^{99}$Mo-radionuclide activity: $A_1$ = 1250.0 mCi $^{99}$Mo Weight of sorbent in one purification column, m(p) = 1.125 g p = 5.625% of M Unloaded zone: 69.375% of M $p_1$ = p + Unloaded zone = 75.0% of M Separation performance: 1. Operation function 1 (Generator A): Product-Eluate volume: 40 mL (2.0 mL/g sorbent) Inherent concentration factor: Fi(1) = 1 $^{99m}$Tc-concentration in the eluate: $C_{01}$ = 31.25 mCi/mL 2. Operation (Generator B) in coupling with ULTRALUTE ® Radioisotope Concentrator: Primary eluent volume: 40 mL (2.0 mL/g sorbent) Concentrated product-eluate volume: Vc = 3.0 mL Combined concentration factor increased: Fc (25%) = 13.333 Concentrated eluate $^{99m}$Tc-concentration increased: $C_{c(1)}$ = 416.67 mCi/mL | Generator specification: Weight of sorbent in the generator columns: M = 20.0 g (including 1.125 g of the sorbent in the purification column) Parent $^{99}$Mo-radionuclide Loading m(L) = 18.875.0 g L = 94.375% of M (100% loading of SC column) Parent $^{99}$Mo-radionuclide activity: $A_x$ = 4718.7 mCi $^{99}$Mo Weight of sorbent in one purification column, m(p) = 1.125 g p = 5.625% of M Unloaded zone: 0.00% of M $p_x$ = p + Unloaded zone = 5.625% of M Separation performance: 1. Operation function 1 (Generator C): Product-Eluate volume: 40 mL (2.0 mL/g sorbent) Inherent concentration factor increased: Fi(x) = 3.775 $^{99m}$Tc-concentration in the eluate increased: $C_{0x}$ = 117.97 mCi/mL 2. Operation function 2 & 3 (Generator D): Primary eluent volume: 40 mL (2.0 mL/g sorbent) Concentrated product-eluate volume: Vc = 3.0 mL Combined concentration factor increased: Fc (94.37%) = 50.33 Concentrated eluate $^{99m}$Tc-concentration increased: $C_{c(x)}$ = 1572.9 mCi/mL |

TABLE 1

Performance of comparative conventional DFCC-based $^{68}$Ga-generator and AFCC-based $^{68}$Ga-generators of this invention, Sorbent: Nano-crystalline mixed metal oxide ZT-11 sorbent (Adsorption capacity: 1.3 mg Ge per gram sorbent; Patent application WO 2011/106847 A1) and Multifunctional sorbent ISOSORB-MOX-HP (Adsorption capacity: 3.0 mg Ge/g; Patent Application Publication WO 2015/039170A1); $^{68}$Ge-source of high specific activity: 1.6 mCi $^{68}$Ge/µg Ge

| Generator and production method | Parent nuclide activity of the generator | Generator column, (Sorbent/ Weight) | Purification columns, (Sorbent/ Weight) | Elution volume of 0.1M HCl solution (eluent) | Radio-nuclide purity ($^{68}$Ge-break-through | $^{68}$Ga-elution yield, | Expiry time with one elution per day |
| --- | --- | --- | --- | --- | --- | --- | --- |
| AFCC-based $^{68}$Ga-generators of this invention | 2083.0 MBq (56.3 mCi) | ZT-11 Sorbent/ 30.0 mg | 2 columns; ZT-11 Sorbent/ 500 mg each column | 1.5-1.8 mL | $10^{-5}$-$10^{-6}$% | >85% | >500 days last; Shorter elution profile |
| Comparative conventional DFCC-based $^{68}$Ga-generators | 2083.0 MBq (56.3 mCi) | ZT-11 Sorbent/ 1500.0 mg | Not used | 4-6 mL | $10^{-4}$-$10^{-5}$% | >80% | 200 days last; Longer elution profile |

TABLE 1-continued

Performance of comparative conventional DFCC-based $^{68}$Ga-generator and AFCC-based $^{68}$Ga-generators of this invention, Sorbent: Nano-crystalline mixed metal oxide ZT-11 sorbent (Adsorption capacity: 1.3 mg Ge per gram sorbent; Patent application WO 2011/106847 A1) and Multifunctional sorbent ISOSORB-MOX-HP (Adsorption capacity: 3.0 mg Ge/g; Patent Application Publication WO 2015/039170A1); $^{68}$Ge-source of high specific activity: 1.6 mCi $^{68}$Ge/μg Ge

| Generator and production method | Parent nuclide activity of the generator | Generator column, (Sorbent/ Weight) | Purification columns, (Sorbent/ Weight) | Elution volume of 0.1M HCl solution (eluent) | Radio-nuclide purity ($^{68}$Ge-break-through) | $^{68}$Ga-elution yield, | Expiry time with one elution per day |
|---|---|---|---|---|---|---|---|
| AFCC-based $^{68}$Ga-generators of this invention | 5550.0 MBq (150.0 mCi) | ISOSORB-MOX-HP sorbent/ 50.0 mg | 2 columns; ISOSORB-MOX-HP sorbent/ 750.0 mg each column | 2-2.5 mL | $10^{-5}$-$10^{-6}$% | >85% | >500 days last; Shorter elution profile |

TABLE 2

Performance of comparative conventional DFCC-based $^{99m}$Tc-generators and AFCC-based $^{99m}$Tc-generators of this invention, Sorbents: PZC sorbent (Adsorption capacity: 250 mg W per gram Sorbent) and Multifunctional sorbent ISOSORB-MOX-HP (Adsorption capacity: 300 mg Mo/g; Patent Application Publication WO 2015/039170A1); $^{99}$Mo source of low specific activity: 1.0 mCi $^{99}$Mo/mg Mo.

| Generator and its production method | Parent nuclide activity of the generator | Generator column, (Sorbent/ Weight) | Purification columns, (Sorbent/ Weight) | Elution volume of Saline eluent | Radio-nuclide purity ($^{99}$Mo-break-through) | $^{99m}$Tc-elution yield, | Expiry time with one elution per day |
|---|---|---|---|---|---|---|---|
| AFCC-based $^{99m}$Tc-generators of this invention | 92.0 GBq (2486.0 mCi) | PZC sorbent/ 10.0 g | 2 columns; Alumina/ 1.5 g each column | 20-22 mL | <0.001% | >85% | >60 days last; Shorter elution profile |
| Comparative conventional DFCC-based $^{99m}$Tc-generators | 92.0 GBq (2486.0 mCi) | PZC sorbent/ 30.0 g | Not used | 55-65 mL | <0.01% | >80% | 15 days last; Longer elution profile |
| AFCC-based $^{99m}$Tc-generators of this invention | 200.0 GBq (5405.0 mCi) | ISOSORB-MOX-HP sorbent/ 20.0 g | 2 columns; ISOSORB-MOX-HP sorbent/ 1.5 g each column | 35-40 mL | <0.001% | >85% | >60 days last; Shorter elution profile |

TABLE 3

Performance of comparative conventional DFCC-based $^{188}$Re- generator and AFCC-based $^{188}$Re- generators of this invention, Sorbents: Alumina (Adsorption capacity: 100-120 mg W per gram Sorbent) and Multifunctional sorbent ISOSORB-MOX-HP (Adsorption capacity: 500 mg W/g Patent Application Publication WO 2015/039170A1); $^{188}$W-source of low specific activity: 5.0 mCi $^{188}$W/mg W

| Generator and its production method | Parent nuclide activity of the generator | Generator column, (Sorbent/ Weight) | Purification columns, (Sorbent/ Weight) | Elution volume of Saline eluent | Radio-nuclide purity ($^{188}$W break-through) | $^{188}$Re -elution yield, | Expiry time with one elution per day |
|---|---|---|---|---|---|---|---|
| AFCC-based $^{188}$Re-generators of this invention | 20.0 GBq (540.0 mCi) | Alumina/ 0.5 g | 2 columns; Alumina/ 0.5 g each column | 2.5-3.5 mL | $10^{-4}$-$10^{-5}$% | >85% | >300 days last; Shorter elution profile |
| Comparative conventional DFCC-based $^{188}$Re-generators | 20.0 GBq (540.0 mCi) | Alumina/ 2.0 g | Not used | 8-10 mL | $10^{-3}$-$10^{-4}$% | >80% | <150 days last; Longer elution profile |
| AFCC-based $^{188}$Re-generators of this invention | 55.0 GBq (1486.0 mCi) | ISOSORB-MOX-HP sorbent/ 0.8 g | 2 columns; ISOSORB-MOX-HP sorbent/ 0.5 g each column | 4-5 mL | $10^{-4}$-$10^{-5}$% | >85% | >300 days last; Shorter elution profile |

TABLE 4

Performance comparison of AFCC-based $^{99m}$Tc-generators with and without selective elution operation function described in this invention; Sorbent of generator column: Multifunctional sorbent ISOSORB-MOX-HP (Adsorption capacity: 250 mg Mo/g; Patent Application Publication WO 2015/039170A1); $^{99}$Mo source of low specific activity: 1.0 mCi $^{99}$Mo/mg Mo.

| Generator and Operation Function | Parent Mo-99 nuclide activity | ISOSORB-MOX-HP sorbent weight of generator column | Purification columns, (Sorbent/Weight) | Elution volume of primary eluent | Elution volume of specific eluent, $V_c$ | Radio-nuclide purity | $^{99m}$Tc- yield; $^{99m}$Tc-concentration; Concentration factor $F_i$ Concentration factor $F_c$ |
|---|---|---|---|---|---|---|---|
| AFCC-based $^{99m}$Tc-generator D (with specific elution function)/ Function 2 | 174.6 GBq (4718.7 mCi) | 18.875.0 g; $L_x$ = 100% loading (18.875 g sorbent is fully loaded with Mo-99) $p_x$ = 94.375% | 2 columns; Alumina or ISOSORB-MOX-HP/ 1.125 g each column | 40.0 mL 0.05-0.1% NaCl solution | 3.0 mL 0.9% NaCl solution (for eluting the eluate of $^{99m}$Tc product) | <0.001% ($^{99}$Mo-break-through) | Yield: 100.0%; Tc-99m Concentration in final eluate: 1572.9 mCi/mL, with $F_c$ (2) = 50.333 $F_i$ (2) = 3.775 Activity increase: ($A_{AFCC}/A_{DFCC}$) = 3.775 (Activity: 174.6 GBq) |
| AFCC-based $^{99m}$Tc-generator C (without specific elution function)/ Function 1 | 174.6 GBq (4718.7 mCi) | 18.875.0 g; $L_x$ = 100% loading (18.875 g sorbent is fully loaded with Mo-99) $p_x$ = 94.375% | 2 columns; Alumina or ISOSORB-MOX-HP/ 1.125 g each column | 40.0 mL 0.05-0.1% NaCl solution | Not applied | <0.001% ($^{99}$Mo-break-through) | Yield: 100.0%; Tc-99m Concentration in final eluate: 118.0 mCi/mL $F_i$ (2) = 3.775 Activity increase: ($A_{AFCC}/A_{DFCC}$) = 3.775 (Activity: 174.6 GBq) |
| (*) DFCC-based $^{99m}$Tc-generator B (with specific elution operation function)/Function 2 | 46.25 GBq (1250.0 mCi) | 18.875.0 g; $L_1$ = 25% loading (5.0 g sorbent is fully loaded with Mo-99) $p_1$ = 75% | 2 columns; Alumina or ISOSORB-MOX-HP/ 1.125 g each column | 40.0 mL 0.05-0.1% NaCl solution | 3.0 mL 0.9% NaCl solution (for eluting the eluate of $^{99m}$Tc product) | <0.001% ($^{99}$Mo-break-through) | Yield: 100.0%; Tc-99m Concentration in final eluate: 416.7 mCi/mL, with $F_c$ (1) = 13.333 (**) $F_i$ (1) = 1.00 (Activity: 46.25 GBq) |
| (*) DFCC-based $^{99m}$Tc-generator A (without specific elution operation function)/Function 1 | 46.25 GBq (1250.0 mCi) | 18.875.0 g; $L_1$ = 25% loading (5.0 g sorbent is fully loaded with Mo-99) $p_1$ = 75% | 2 columns; Alumina or ISOSORB-MOX-HP/ 1.125 g each column | 40.0 mL 0.05-0.1% NaCl solution | Not applied | <0.001% ($^{99}$Mo-break-through) | Yield: 100.0%; Tc-99m Concentration in final eluate: 31.25 mCi/mL $F_i$ (1) = 1.00 (Activity: 46.25 GBq) |

(*) For comparative purpose
(**) $F_c$ (1) = [(Elution Yield/100) * ($V_1 \times C_1$)/$V_c$]/$C_1$ = [(100/100) * (40 × 31.25)/3]/31.25 = 1*(40/3) = 13.333

TABLE 5

Performance comparison of AFCC-based $^{68}$Ga-generators with and without further purification operation function described in this invention, Sorbent of generator column: Multifunctional sorbent ISOSORB-MOX-HP (Adsorption capacity: 3.0 mg Ge/g; Patent Application Publication WO 2015/039170A1); Sorbent of purification columns: Mixed resins (Mixture of 50 mg strong cation exchange resin AG-50W-X4 and 50 mg TODGA-OASIS resin (N,N,N',N'-tetraoctldiglycoamide impregnated OASIS ®-HLB resin, Waters's product, 54.4 µm particle size); $^{68}$Ge-source of high specific activity: 1.6 mCi $^{68}$Ge/µg Ge

| Generators and its production method | Parent nuclide activity | Generator column, (Sorbent/Weight) | Purifying columns, (Sorbent/Weight) | Elution volume of 0.1M HCl solution (Primary eluent) | Elution volume of specific eluent 1 for further purifying $^{68}$Ga on PC column | Elution volume of specific eluent 2 for eluting the eluate of $^{68}$Ga-product | Radio-nuclide purity, ($^{68}$Ge-break-through; main metallic contaminants) | $^{68}$Ga-elution yield, |
|---|---|---|---|---|---|---|---|---|
| AFCC-based $^{68}$Ga-generators without further purification operation function | 5550 MBq (151.0 mCi) | ISOSORB-MOX-HP sorbent/ 50.0 mg | 2 columns; Mixed resins, 100.0 mg each column | 2.5-3.0 mL | Not applied | Not applied | $10^{-5}$-$10^{-6}$% $^{68}$Ge; 0.05 ppm $Cu^{2+}$; 0.5 ppm $Fe^{3+}$ | >85% |
| AFCC-based $^{68}$Ga-generators with further purification operation function | 5550.0 MBq (150.5 mCi) | ISOSORB-MOX-HP sorbent/ 50.0 mg | 2 columns; Mixed resins, 100.0 mg each column | 2.5-3.0 mL | 5.0 ml 4M HCl + 1% Ascorbic acid solution | 1.0-1.5 mL 0.05M HCl solution | $10^{-6}$-$10^{-8}$% $^{68}$Ge; 0.025 ppm $Cu^{2+}$; 0.15 ppm $Fe^{3+}$ | >85% |

The invention claimed is:

1. An alternating flow column chromatography apparatus for chromatographic separation and chromatographic purification of ionic radionuclide components and chemical components soluble in a solution comprising:
   a chromatographic separation column of 'U' shape or modified 'I' shape, including at least one loading port for loading of components for separation;
   a first purification column in fluid communication with one end of the separation column and a second purification column in fluid communication with another end of the separation column;
   at least one eluent input port;
   an eluate output port; and
   an alternating flow valve in fluid communication with the at least one eluent input port, the eluate output port, the first purification column and the second purification column wherein, when operated, the alternating flow valve reverses the flow of eluent through the purification columns and the separation column.

2. The apparatus of claim 1 wherein one of the at least one eluent input port is a primary eluent input port and there are one or more specific eluent input ports.

3. The apparatus of claim 1 wherein at least one of the at least one loading port is disposed at the center of the chromatographic separation column or at an end of the separation column.

4. The apparatus of claim 1 further comprising an eluent selection valve for selecting between the at least one eluent input ports.

5. The apparatus of claim 1 further comprising a vacuum source that supplies a driving force for eluent/eluate liquid flow communication.

6. The apparatus of claim 1 wherein the separation column is pre-packed with sorbent powders of particle size from 50 μm to 200 μm and components for separation are loaded via one of the at least one loading ports.

7. The apparatus of claim 1 wherein the separation column is loaded with slurry of solid substrate powders of particle size from 50 μm to 200 μm containing components for separation through the loading port.

8. The apparatus of claim 1 wherein the purification columns are pre-packed with sorbent powders of particle size from 30 μm to 150 μm.

9. The apparatus of claim 1 wherein the columns are packed with inorganic or organic solid sorbent or inorganic or organic solid substrate having an affinity for at least one component of the components for separation and very little or no affinity for at least another component of the components for separation.

10. The apparatus of claim 1 comprising more than one purification column at each side of the separation column.

11. The apparatus of claim 1 wherein the alternating flow valve is a manually operated valve or an electrically operated valve or a pneumatically operated valve or an hydraulically operated valve.

12. The apparatus of claim 1 comprising a processor that operates the alternating flow valve according to a predetermined program.

13. The alternating flow column chromatography apparatus of claim 1 configured as a radionuclide generator wherein the chromatographic separation column is a generator column and wherein the components are radioisotopes.

14. A method of radionuclide generation in an alternating flow column chromatography apparatus of claim 13 including the steps of:
   loading the generator column with sorbent powder;
   immobilizing the ionic parent radionuclide (a product-generating component) in the generator column;
   delivering eluent through the alternating flow valve to the purification columns and generator column;
   eluting eluate of daughter radionuclide (product component) from the generator column and purification columns;
   collecting the eluate of daughter radionuclide; and
   periodically operating the alternating flow valve to reverse the direction of flow of eluent through the purification columns and the generator column for a consecutive elution-purification process and repeating the elution steps of eluting eluate for collecting the eluate of daughter radionuclide (without repeating the step of immobilizing the ionic parent radionuclide,) for the whole life time of the parent radionuclide and/or for whole life time of a medically useful radionuclide generator.

15. The method of claim 14 wherein the step of loading the generator column is by loading sorbent powder and components for separation together or by first loading sorbent powder and then fully or at least almost fully loading components for separation separately or loading slurry of solid substrate powders containing a mixture of parent radionuclides (product daughter radionuclide generating component) and daughter radionuclide.

16. The method of claim 14 wherein the step of delivering eluent includes delivering primary eluent and/or specific eluent.

17. A method of alternating flow column chromatography in an alternating flow column chromatography apparatus comprising: a separation column including at least one loading port for loading of components for separation; a first purification column in fluid communication with one end of the separation column and a second purification column in fluid communication with another end of the separation column; at least one eluent input port; an eluate output port; and an alternating flow valve in fluid communication with the at least one eluent input port, the eluate output port, the first purification column and the second purification column including the steps of:
   loading the separation column with sorbent powder and components for separation;
   delivering eluent through the alternating flow valve and the purification columns to the separation column;
   eluting eluate of a desired component from the separation column; collecting the eluate of desired component; and
   periodically operating the alternating flow valve to reverse the direction of the flow of eluent through the purification columns and the separation column.

18. The method of claim 17 including the steps of repeatedly reversing the flow of eluent for each elution.

19. The method of claim 17 wherein the ionic product-generating component or one of the components to be separated is immobilized in the separation column at the loading step and then at the separation elution step.

20. The method of claim 17 wherein step of loading the separation column is by solution loading or slurry loading.

21. The method of claim 17 wherein the separation column is first loaded with sorbent powder and then fully or at least almost fully loaded with components for separation separately.

22. The method of claim 17 wherein the step of delivering eluent includes delivering primary eluent and/or specific eluent.

\* \* \* \* \*